United States Patent
Wang et al.

(10) Patent No.: US 12,525,016 B2
(45) Date of Patent: Jan. 13, 2026

(54) VIDEO CLIP POSITIONING METHOD AND APPARATUS, COMPUTER DEVICE, AND STORAGE MEDIUM

(71) Applicant: Tencent Technology (Shenzhen) Company Limited, Shenzhen (CN)

(72) Inventors: Jingwen Wang, Shenzhen (CN); Yijun Song, Shenzhen (CN); Lin Ma, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 584 days.

Patent file contains an affidavit/declaration under 37 CFR 1.130(b).

(21) Appl. No.: 17/949,984

(22) Filed: Sep. 21, 2022

(65) Prior Publication Data

US 2023/0024382 A1    Jan. 26, 2023

Related U.S. Application Data

(63) Continuation of application No. PCT/CN2021/100860, filed on Jun. 18, 2021.

(51) Int. Cl.
*G06V 20/40*      (2022.01)
*G06V 10/74*      (2022.01)
(Continued)

(52) U.S. Cl.
CPC .............. *G06V 20/46* (2022.01); *G06V 10/74* (2022.01); *G06V 10/806* (2022.01); *G06V 20/49* (2022.01); *G11B 27/102* (2013.01); *G11B 27/34* (2013.01)

(58) Field of Classification Search
CPC .......... G06V 20/49; G06V 20/48; G06V 20/46
See application file for complete search history.

(56) References Cited

U.S. PATENT DOCUMENTS

| 8,494,234 B1 * | 7/2013 | Bozinovic ............. G06F 16/783 382/103 |
| 2007/0106646 A1 | 5/2007 | Stern et al. |

(Continued)

FOREIGN PATENT DOCUMENTS

| CN | 107027060 A | 8/2017 |
| CN | 110225368 A | 9/2019 |
| CN | 111866607 A | 10/2020 |

OTHER PUBLICATIONS

Tencent Technology, WO, PCT/CN2021/100860, Sep. 1, 2021, 4 pgs.

(Continued)

*Primary Examiner* — Molly Wilburn
(74) *Attorney, Agent, or Firm* — Morgan, Lewis & Bockius LLP

(57) ABSTRACT

This application discloses a video clip positioning method performed by a computer device. In this application, clip features of video clips in a video are determined according to the unit features of video units within the video clips, so that the acquired clip features integrate the features of the video units and the time sequence correlation between the video units; and then the clip features of the video clips and a text feature of a target text are fused. The features of video clip dimensions and the time sequence correlation between the video clips are fully used in the feature fusion process, so that more accurate attention weights can be acquired based on the fused features. The attention weights are used to represent matching degrees between the video clips and (Continued)

the target text, and then a target video clip matching the target text can be positioned more accurately.

20 Claims, 12 Drawing Sheets

(51) Int. Cl.
*G06V 10/80* (2022.01)
*G11B 27/10* (2006.01)
*G11B 27/34* (2006.01)

(56) References Cited

U.S. PATENT DOCUMENTS

| | | | |
|---|---|---|---|
| 2017/0011264 A1* | 1/2017 | Smolic | G11B 27/105 |
| 2017/0061250 A1* | 3/2017 | Gao | G06V 20/70 |
| 2017/0357720 A1 | 12/2017 | Torabi et al. | |
| 2020/0302294 A1* | 9/2020 | Kadav | G06F 16/783 |
| 2023/0086735 A1* | 3/2023 | Yan | G06F 16/738 |
| | | | 382/190 |

OTHER PUBLICATIONS

Tencent Technology, IPRP, PCT/CN2021/100860, Jan. 31, 2023, 5 pgs.

Tencent Technology, ISR, PCT/CN2021/100860, Sep. 1, 2021, 2 pgs.

Yijun Song et al., "Weakly-Supervised Multi-Level Attentional Reconstruction Network for Grounding Textual Queries in Videos" Mar. 16, 2020, 21 pgs., Retrieved from the Internet: https://arxiv.org/pdf/2003.07048v1.pdf.

* cited by examiner

VIDEO CLIP POSITIONING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2021/100860, entitled "VIDEO CLIP POSITIONING METHOD AND APPARATUS, AND COMPUTER DEVICE AND STORAGE MEDIUM" filed on Jun. 18, 2021, which claims priority to Chinese Patent Application No. 202010753184.4, filed with the State Intellectual Property Office of the People's Republic of China on Jul. 30, 2020, and entitled "VIDEO CLIP POSITIONING METHOD AND APPARATUS, COMPUTER DEVICE, AND STORAGE MEDIUM", all of which are incorporated herein by reference in their entirety.

FIELD OF THE TECHNOLOGY

This application relates to the field of video processing technologies, and in particular, to video clip positioning.

BACKGROUND OF THE DISCLOSURE

With the popularization of video applications, there is an increasing number of videos on the network, and a demand for quickly and accurately positioning a video clip based on a piece of text information during video watching increases accordingly.

Currently, during video clip positioning based on a piece of text information, it is usually necessary to input the text information and a video into a video recognition model, and the video recognition model extracts frame features of video frames in the video and a text feature of the text information, and matches the video frames with the text information based on the frame features and the text feature, so as to determine degrees of matching between the video frames and the text information, thereby positioning the video clip in the video that best matches the text information.

SUMMARY

Embodiments of this application provide a video clip positioning method and apparatus, a computer device, and a storage medium, which can improve accuracy of a video clip positioning result. The technical solutions are as follows:

According to an aspect, a video clip positioning method is provided, including:

extracting features from video units included in at least two video clips in a video, to obtain unit features of the video units;

acquiring clip features of the at least two video clips based on the unit features of the video units included in the at least two video clips;

performing feature fusion on the clip features of the at least two video clips with a text feature of a target text respectively, to obtain fused clip features of the at least two video clips;

obtaining first attention weights of the at least two video clips based on the fused clip features of the at least two video clips, each first attention weight being used for indicating a matching degree between a respective video clip and the target text; and acquiring, from the at least two video clips and according to the first attention weights, a video clip whose matching degree with the target text meets a reference condition, as a target video clip in the video that is associated with the target text.

According to an aspect, a video clip positioning apparatus is provided, including:

a first acquisition module, configured to extract features from video units included in at least two video clips in a video, to obtain unit features of the video units;

a second acquisition module, configured to acquire clip features of the at least two video clips based on the unit features of the video units included in the at least two video clips;

a feature fusion module, configured to perform feature fusion on the clip features of the at least two video clips with a text feature of a target text respectively, to obtain fused clip features of the at least two video clips;

a third acquisition module, configured to obtain first attention weights of the at least two video clips based on the fused clip features of the at least two video clips, each first attention weight being used for indicating a matching degree between a respective video clip and the target text; and a fourth acquisition module, configured to acquire, from the at least two video clips and according to the first attention weights, a video clip whose matching degree with the target text meets a reference condition, as a target video clip in the video that is associated with the target text.

According to an aspect, a computer device is provided, including one or more processors and one or more memories, the one or more memories storing at least one piece of program code, the at least one piece of program code being loaded and executed by the one or more processors to implement the operations performed in the video clip positioning method.

According to an aspect, a non-transitory computer-readable storage medium is provided, storing a computer program, the computer program being configured to perform the video clip positioning method according to the foregoing aspects.

According to an aspect, a computer program product is provided, including at least one piece of program code, the at least one piece of program code being stored in a computer-readable storage medium. A processor of a computer device reads the at least one piece of program code from the computer-readable storage medium, and the processor executes the at least one piece of program code, to cause the computer device to implement the operations performed in the video clip positioning method.

According to the technical solutions provided in the embodiments of this application, unit features of the video unit dimension are acquired, and clip features of video clips are determined according to the unit features, so that the acquired clip features integrate the features of a plurality of video units and the time sequence correlation between the video units; and then the clip features of the video clips and a text feature of a target text are fused. The features of video clip dimensions and the time sequence correlation between the video clips are fully used in the feature fusion process, so that more accurate attention weights can be acquired based on the fused features. The attention weights are used to represent degrees of matching between the video clips and the target text, and then a target video clip matching the target text can be positioned more accurately when video clip positioning is performed based on the attention weights.

DESCRIPTION OF EMBODIMENTS

To make the objectives, technical solutions, and advantages of this application clearer, the following further describes the implementations of this application in detail with reference to the accompanying drawings. Apparently, the described embodiments are some rather than all the embodiments of this application. All other embodiments obtained by a person of ordinary skill in the art based on the embodiments of this application without creative efforts shall fall within the protection scope of this application.

The terms "first", "second", and the like in this application are used for distinguishing between same items or similar items of which effects and functions are basically the same. The "first", "second", and "nth" do not have a dependency relationship in logic or time sequence, and a quantity and an execution order thereof are not limited.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology of computer science, which attempts to understand essence of intelligence and produces a new intelligent machine that can react in a manner similar to human intelligence. AI is to study the design principles and implementation methods of various intelligent machines, to enable the machines to have functions of perception, reasoning, and decision-making.

The AI technology is a comprehensive discipline, covering a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration. AI software technologies mainly include several fields such as a computer vision technology, a speech processing technology, a natural language processing technology, and machine learning. This application relates to the computer vision technology in the AI technologies, and a video recognition model is applied to perform semantic understanding on a video, and accurately positions, based on a text description, a video clip matching the text description from the video, without requiring users to manually screen a large quantity of videos.

Figure 1:
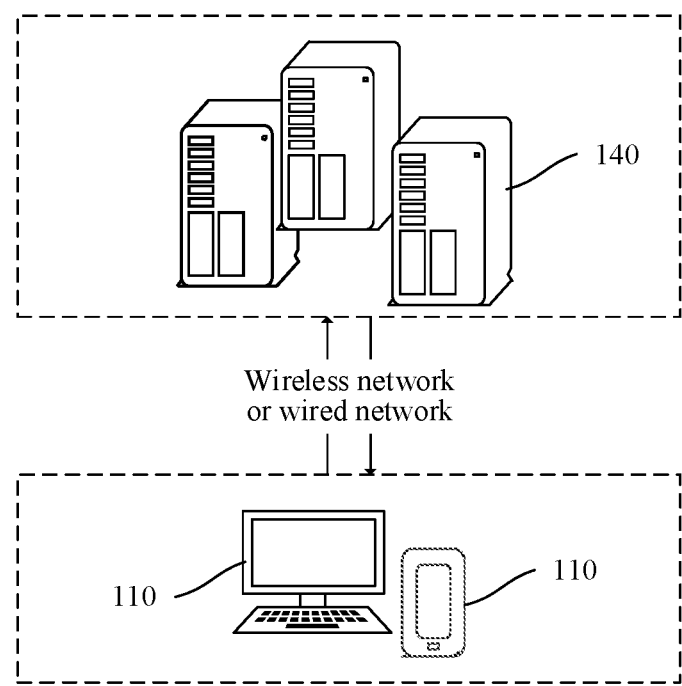
FIG. 1 is a schematic diagram of an implementation environment of a video clip positioning method according to an embodiment of this application.

FIG. 1 is a schematic diagram of an implementation environment of a video clip positioning method according to an embodiment of this application. The implementation environment includes a terminal 110 and a video recognition platform 140.

The terminal 110 may be a smartphone, a tablet computer, a notebook computer, a desktop computer, a smart speaker, a smartwatch, or the like, but is not limited thereto. An application that supports video recognition and video clip positioning is installed and run on the terminal 110. The application may be a video retrieval application, or the like. For example, the terminal 110 is a terminal used by a user, and the application running on the terminal 110 logs in to a user account. The terminal 110 may generally refer to one of a plurality of terminals. In this embodiment, the terminal 110 is merely used as an example for description.

The video recognition platform 140 is configured to provide a background service for the application that supports video clip positioning. In some embodiments, the video recognition platform 140 undertakes primary video recognition work, and the terminal 110 undertakes secondary video recognition work. Alternatively, the video recognition platform 140 undertakes secondary video recognition work, and the terminal 110 undertakes primary video recognition work. Alternatively, the video recognition platform 140 or the terminal 110 may separately undertake video recognition work. In some embodiments, the video recognition platform 140 includes an access server, a video recognition server, and a database. The access server is configured to provide an access service for the terminal 110. The video recognition server is configured to provide a background service related to video recognition and video clip positioning. There may be one or more video recognition servers. When there are a plurality of video recognition servers, at least two video recognition servers are configured to provide different services, and/or at least two video recognition servers are configured to provide the same service, for example, provide the same service in a load balancing manner. This is not limited in this embodiment of this application. A video recognition model may be set in the video recognition server. The video recognition server provides support for the training and application process of the model. The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

The terminal 110 and the video recognition platform 140 may be directly or indirectly connected in a wired or wireless communication manner. This is not limited in the embodiments of this application.

A person skilled in the art may learn that there may be more or fewer terminals. For example, there may be only one terminal, or there may be dozens of or hundreds of or more terminals. The quantity and the device type of the terminals are not limited in the embodiments of this application.

The embodiments of this application provide a video clip positioning method based on weak supervised learning, which positions a video clip based on a natural language description. The technical solutions provided in this application may be applied to various types of applications and combined with various application scenarios. For example, in a video application, when a user searches for a certain video clip, the user may provide a piece of text information for describing the video clip, and send the text information to a server corresponding to the application; and the server determines a target video clip matching the text information based on a text feature of the text information and a clip feature of each video clip, without requiring the user to manually screen a large quantity of videos. By applying the technical solutions provided in the embodiments of this application, the video clip in which the user is interested can be quickly and accurately positioned, and features of video clip dimensions can be used to perform video clip positioning, so that associations between video clips can be fused in the operation process, to improve the efficiency of video clip positioning.

Figure 2:
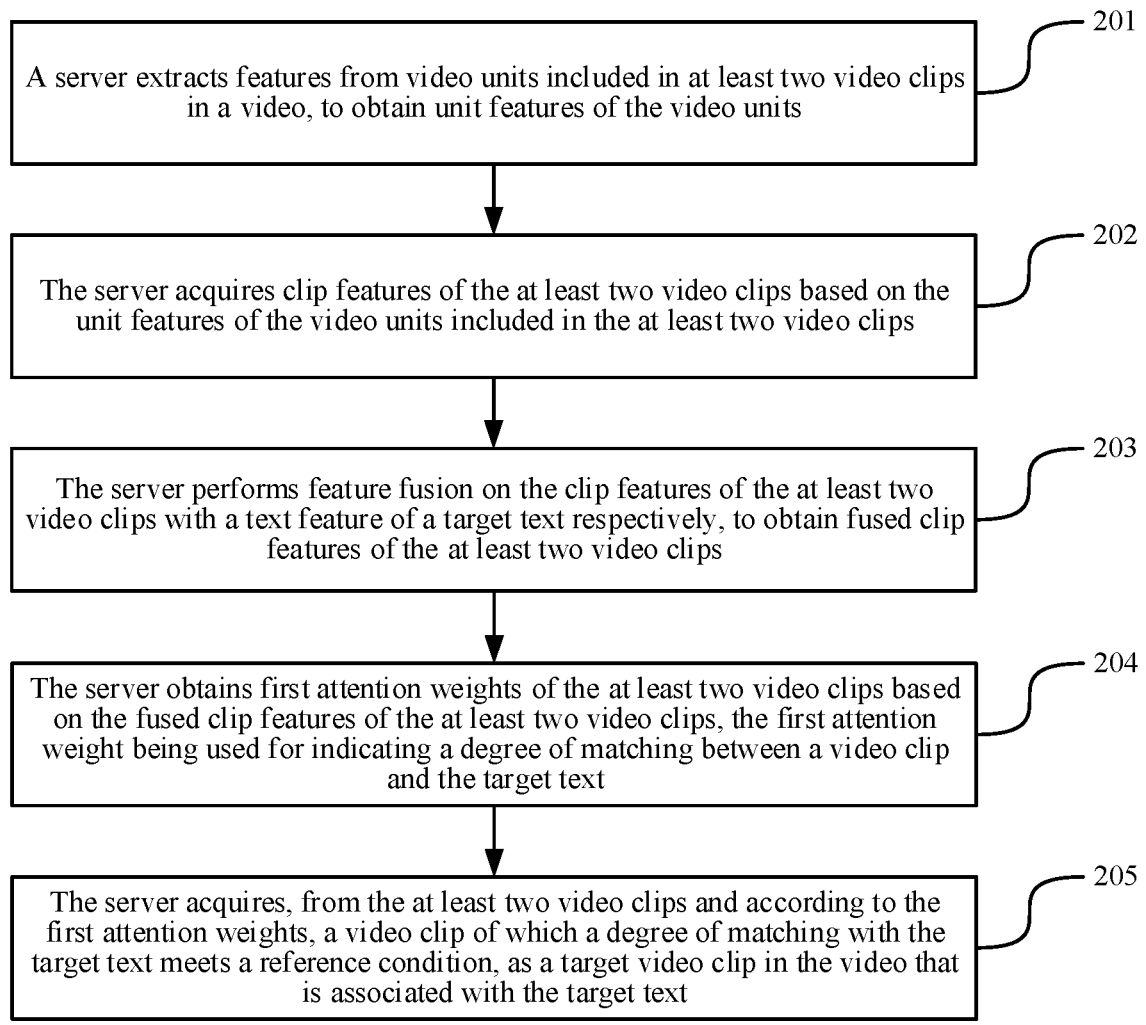
FIG. 2 is a flowchart of a video clip positioning method according to an embodiment of this application.

FIG. 2 is a flowchart of a video clip positioning method according to an embodiment of this application. This method may be applied to the foregoing implementation environment. In this embodiment of this application, a server is used as an execution entity to describe the video clip positioning method. Referring to FIG. 2, this embodiment may specifically include the following steps:

201: The server extracts features from video units included in at least two video clips in a video, to obtain unit features of the video units.

The video may be a video stored in the server, or a video acquired by the server from another device. A specific type of the video is not limited in this embodiment of this application. In this embodiment of this application, a clip of a unit duration in the video may be used as a video unit. The video includes a plurality of consecutive video units, and each video unit includes a plurality of video frames. The unit duration may be set by a developer, which is not limited in this embodiment of this application. For example, if the unit duration is set to 1 second, a clip of every 1 second in the video may be used as a video unit.

Figure 3:
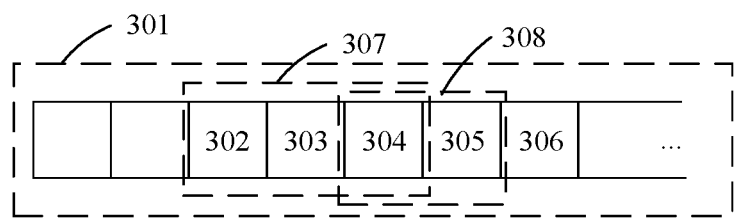
FIG. 3 is a schematic diagram of video clips and video units according to an embodiment of this application.

In this embodiment of this application, the video includes a plurality of video clips of different durations. In a possible implementation, a plurality of video clips of different durations may be determined from the video by using a plurality of sliding windows of different scales. Certainly, the video clips may alternatively be determined by using other methods. This is not limited in this embodiment of this application. FIG. 3 is a schematic diagram of video clips and video units according to an embodiment of this application. Referring to FIG. 3, a video 301 includes a plurality of continuous video units, for example, including video units 302, 303, 304, 305, and 306. The video clip 307 includes video units 302, 303, and 304, and the video clip 308 includes video clips 304 and 305.

In a possible implementation, in response to a video clip positioning instruction for the video, the server may extract features from the video by using a three-dimensional convolutional layer, to obtain unit features of the video units. Certainly, the computer device may alternatively acquire the unit features of the video units by using other methods. This is not limited in this embodiment of this application.

In a video, similarities between adjacent video frames are relatively high. In this embodiment of this application, acquisition of the features of video unit dimensions can reduce data redundancy, and reduce the amount of data of the acquired features, so that the amount of data in the subsequent operation process can be reduced, thereby reducing the operation complexity.

202: The server acquires clip features of the at least two video clips based on the unit features of the video units included in the at least two video clips.

The clip features may be used for representing the color feature, texture feature, and the like of video frame images in the video clips, and may further include the time sequence correlation between the video frames. Different video clips correspond to different clip features.

In a possible implementation, the server determines initial clip features of the video clips based on the video units included in the video clips and the unit features of the video units, then the initial clip features of the video clips are sampled, and features extracted in the sampling process are determined as clip features of the video clips. The foregoing description of the clip feature obtaining method is only an exemplary description, and the specific method for obtaining the clip features is not limited in this embodiment of this application.

In this embodiment of this application, the subsequent video clip positioning steps are performed based on the features of the video clip dimensions, so that the time sequence correlation between the video clips can be fused during the operation, thereby improving the accuracy of the video clip positioning result.

203: The server performs feature fusion on the clip features of the at least two video clips with a text feature of a target text respectively, to obtain fused clip features of the at least two video clips.

The target text is used for describing one video clip, and the target text may be provided by a user. The specific content of the target text is not limited in this embodiment of this application.

In a possible implementation, after acquiring the target text, the server may extract features from the target text, to obtain the text feature of the target text. The specific method for extracting the text feature is not limited in this embodiment of this application. After acquiring the clip features of the video clips and the text feature, the server may perform cross-modal feature fusion on the clip features and the text feature respectively, to obtain the fused clip features of the video clips. In this embodiment of this application, the acquired fused clip features fully integrate the features of the two modalities, and the fused clip features have a better representation effect. By applying the fused clip features for subsequent video clip positioning, the accuracy of the video clip positioning result can be improved.

204: The server obtains first attention weights of the at least two video clips based on the fused clip features of the at least two video clips, the first attention weight being used for indicating a matching degree between a video clip and the target text.

In a possible implementation, the server performs a convolution operation on the fused clip features of the video clips by using at least one convolutional layer, to obtain the first attention weights of the video clips. The first attention weight is in a positive correlation with the degree of matching between the video clip and the target text, that is, a higher attention weight is assigned to a video clip with a high degree of matching with the target text.

205: The server acquires, from the at least two video clips and according to the first attention weights, a video clip whose matching degree with the target text meets a reference condition, as a target video clip in the video that is associated with the target text.

The reference condition may be set by the developer, and this is not limited in this embodiment of this application. For example, the reference condition may be set to using the video clip with the highest attention weight as the target video clip.

According to the technical solution provided in this embodiment of this application, unit features of the video unit dimension are acquired, and clip features of video clips are determined according to the unit features, so that the acquired clip features integrate the features of a plurality of video units and the time sequence correlation between the video units; and then the clip features of the video clips and a text feature of a target text are fused. The features of video clip dimensions and the time sequence correlation between the video clips are fully used in the feature fusion process, so that more accurate attention weights can be acquired based on the fused features. The attention weights are used to represent degrees of matching between the video clips and the target text, and then a target video clip matching the target text can be positioned more accurately when video clip positioning is performed based on the attention weights.

Figure 4:
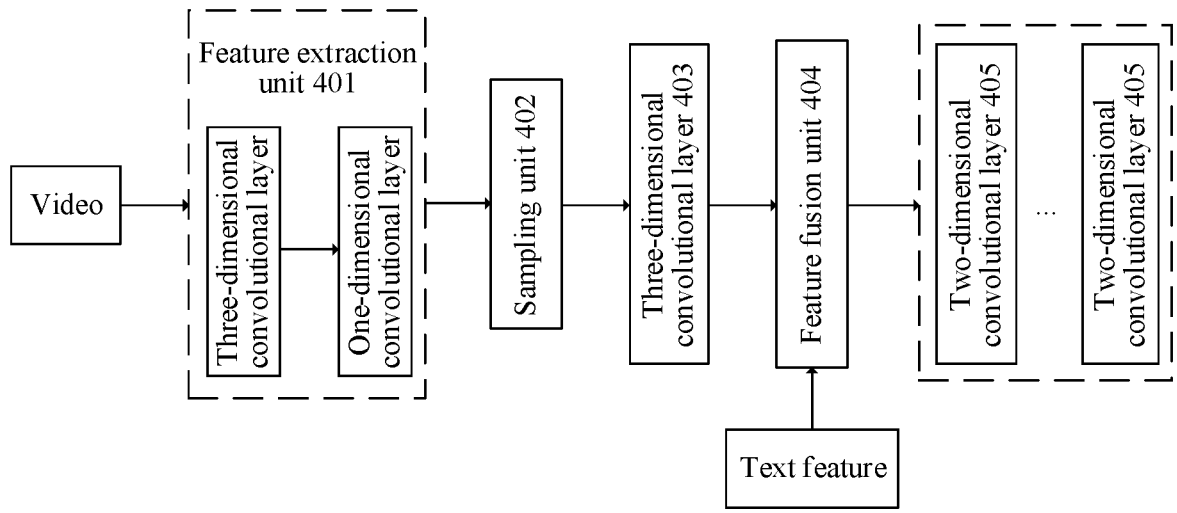
FIG. 4 is a schematic structural diagram of a video recognition model according to an embodiment of this application.

The foregoing embodiment is a brief description for the implementations of this application. In a possible implementation, the server is equipped with a video recognition model, and the video recognition model is configured to provide a video clip positioning function. The server may invoke the video recognition model to perform the steps in the foregoing embodiment. FIG. 4 is a schematic structural diagram of a video recognition model according to an embodiment of this application. The video recognition model may be a model constructed based on a deep neural network. For example, the deep neural network may be a recurrent neural network (RNN), a convolutional neural network (CNN), or the like. As shown in FIG. 4, in a possible implementation, the video recognition model may include a feature extraction unit 401, a sampling unit 402, a three-dimensional convolutional layer 403, a feature fusion unit 404, and at least one two-dimensional convolutional layer 405. The feature extraction unit 401 may include at least one three-dimensional convolutional layer and at least one one-dimensional convolutional layer, and perform a convolution operation on a digital matrix corresponding to the video at least once, to extract the features of the video units in the video; the sampling unit 402 may perform feature sampling based on the video units included in the video clips and the unit features of the video units; the three-dimensional convolutional layer 403 performs a convolution operation on an output result of the sampling unit, to obtain clip features of the video clips; the feature fusion unit 404 is configured to fuse the clip features of the video clips and the text feature of the target text; and the at least one two-dimensional convolutional layer 405 performs a convolution operation on the fused features at least once, to obtain attention weights of the video clips. The specific quantity and connection manner of the feature extraction unit, the sampling unit, the three-dimensional convolutional layer, the feature fusion unit, and the at least one two-dimensional convolutional layer in the video recognition model are not limited in this embodiment of this application.

Figure 5:
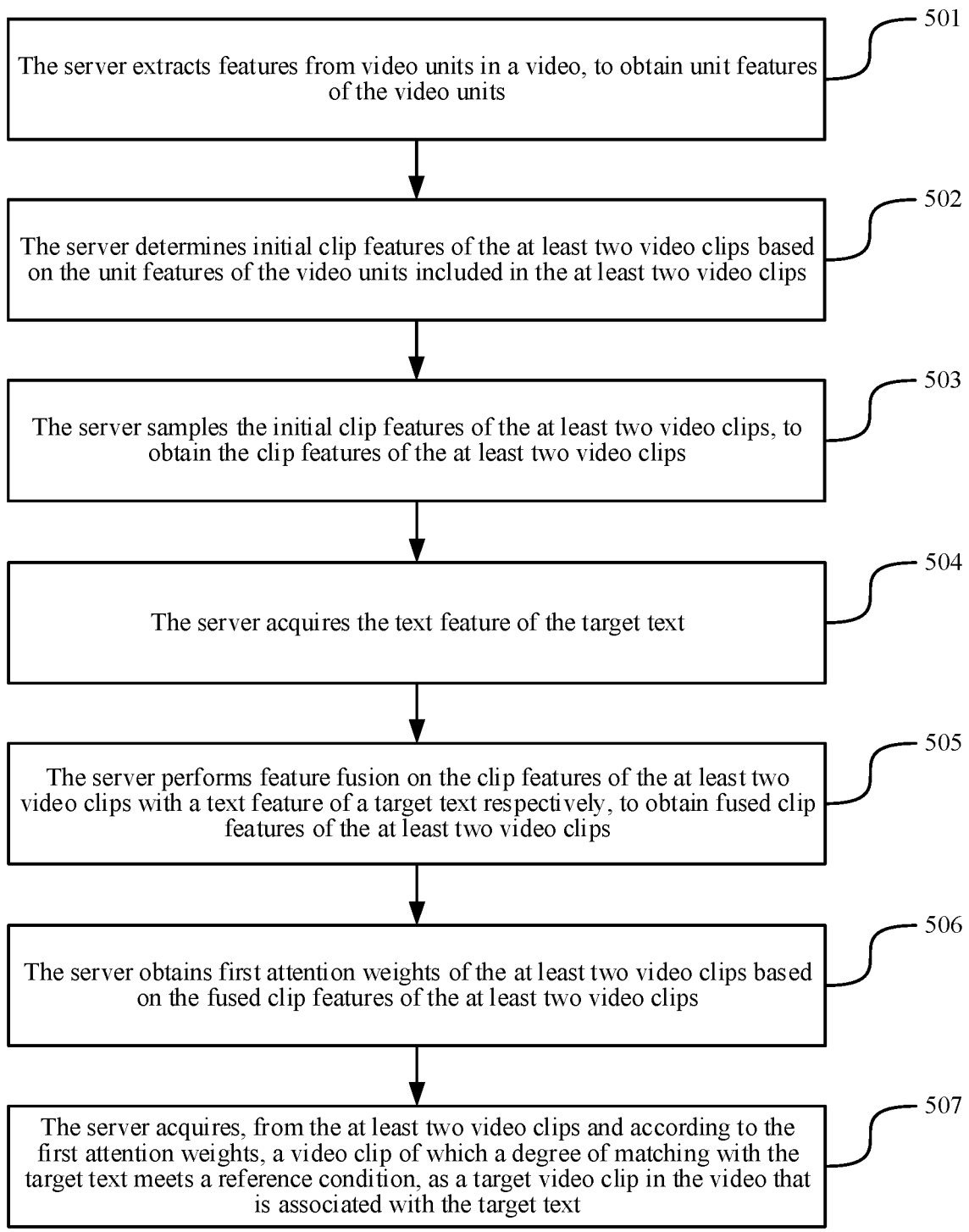
FIG. 5 is a specific flowchart of a video clip positioning method according to an embodiment of this application.

FIG. 5 is a specific flowchart of a video clip positioning method according to an embodiment of this application. The following describes the foregoing video clip positioning method by using the server as the execution entity with reference to FIG. 4 and FIG. 5:

501: The server extracts features from video units in a video, to obtain unit features of the video units.

In a possible implementation, the server receives a video clip positioning request sent by a terminal, invokes the video recognition model, and extracts the unit features of the video units by using the feature extraction unit in the video recognition model. The terminal may be a terminal used by any user, and the user may send a video clip positioning request to the server by using the terminal, to query a video clip of interest. The specific triggering manner of the video clip positioning request is not limited in this embodiment of this application.

In a possible implementation, the video clip positioning request may include a target text for describing a video clip and a video identifier, where the video identifier may be used for uniquely indicating one video clip. The server may acquire, in response to the video clip positioning request, a video indicated by the video identifier, and perform the subsequent video clip positioning steps based on the video and the target text.

In a possible implementation, the video clip positioning request may include target text. In this case, in response to the video clip positioning request, the server may first acquire at least one video matching the target text, and perform the subsequent video clip positioning steps based on the at least one video and the target text. The specific information included in the video clip positioning request is not limited in this embodiment of this application. In this embodiment of this application, video clip positioning being performed on only one video is used as an example for description.

In this embodiment of this application, an example in which the feature extraction unit of the video recognition model includes a three-dimensional convolutional layer and a one-dimensional convolutional layer is used to describe the process of acquiring the unit features. In a possible implementation, the server converts video frames in the video into a digital matrix including a group of pixel values. Certainly, the server may further perform size transformation, denoising processing, and the like on the video frames. This is not limited in this embodiment of this application. The server inputs the digital matrix corresponding to the video frames into the video recognition model. The three-dimensional convolutional layer in the feature extraction unit first performs a convolution operation on the digital matrix corresponding to the video frames, to obtain initial unit features of the video units. Subsequently, the one-dimensional convolutional layer performs dimension reduction on the initial unit features, to obtain the unit features of the video units. An example in which the video unit has a duration of 1 second and includes 25 video frames is used. For each video unit, a convolution kernel of the three-dimensional convolutional layer performs a convolution operation on the digital matrix corresponding to the 25 video frames, to obtain the initial unit features; the initial unit features of the video units are arranged according to a time sequence of the video units, to obtain features $F_v$; and the one-dimensional convolutional layer performs a convolution operation on the features $F_v$, to obtain features $F'_v$, one feature in the features F'$_v$ being the unit feature of one video unit. Specifically, the one-dimensional convolution process may be expressed as the following formula (1):

$$F'_v = \text{Conv1d}(F_v) \tag{1}$$

where F'$_v \in$ $$\mathbb{R}^{T \times \frac{d_v}{r}},$$

a dimension of each element in F'$_v$, that is each unit feature, is $$\frac{d_v}{r},$$

and F'$_v$ includes T unit features; r represents an attenuation multiple of the dimension; and Conv1d( ) represents a one-dimensional convolution operation, and the size of the convolution kernel used by the one-dimensional convolution operation may be set by the developer, which is not specifically limited in this embodiment of this application. For example, the convolution kernel may be set to 3, to obtain the time sequence correlation information of the video unit dimension.

The foregoing description of obtaining the unit features of the video units is only an exemplary description, and the specific method for obtaining the unit features is not limited in this embodiment of this application.

502: The server determines initial clip features of the at least two video clips based on the unit features of the video units included in the at least two video clips.

In a possible implementation, for one video clip, the server may acquire unit features of video units included in the video clip, and splicing the unit features based on the time sequence of the video units, for example, sequentially connecting the unit features of video units. The spliced unit feature is used as the initial clip feature of the video clip. The foregoing description of the initial clip feature obtaining method is only an exemplary description, and the specific method for obtaining the initial clip features is not limited in this embodiment of this application.

503: The server samples the initial clip features of the at least two video clips, to obtain the clip features of the at least two video clips.

Figure 6:
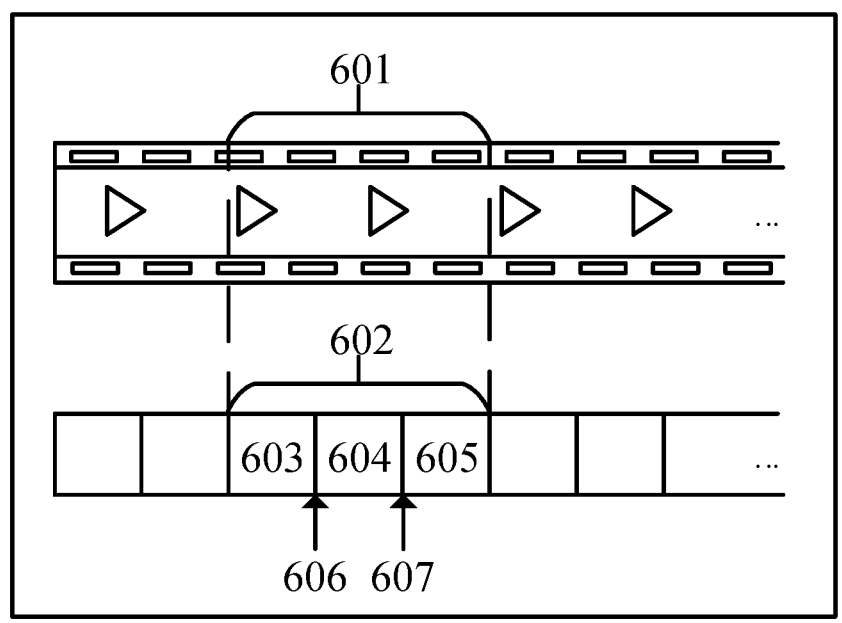
FIG. 6 is a schematic diagram of a sampling method according to an embodiment of this application.
Figure 6:
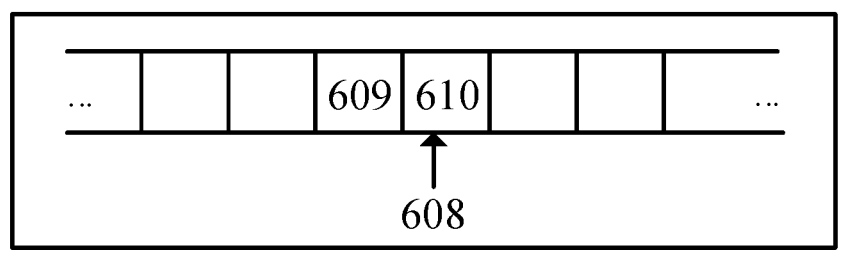

In this embodiment of this application, the server determines sampling moments corresponding to the at least two video clips based on durations of the at least two video clips. For one video clip, the server may sample the initial clip feature of the video clip based on the sampling moment corresponding to the video clip, to obtain the clip feature of the video clip. Each video clip corresponds to a same quantity of sampling moments. The quantity of sampling moments may be set by the developer, and this is not limited in this embodiment of this application. For sampling based on the same quantity of sampling moments, video clips of different durations may be sampled to a fixed duration, and each video clip may correspond to a feature of the same dimension, to facilitate the video recognition model in performing the subsequent operations. FIG. 6 is a schematic diagram of a sampling method according to an embodiment of this application. With reference to FIG. 6, an example in which an initial clip feature of one video clip is sampled is used for description. As shown in part (a) of FIG. 6, a start moment of a video clip 601 in a video is the second second, and the duration is three seconds. An initial clip feature 602 of the video clip includes unit features 603, 604 and 605. The video clip may correspond to two sampling moments, for example, sampling moment 606 and sampling moment 607, respectively. The sampling moment 606 is used as an example. The sampling moment 606 is a moment between two video units. When sampling is performed at this moment, a weighting operation needs to be performed on the unit feature 603 and the unit feature 604 to obtain a sampling feature. For example, the total weight of the two unit features is 1. Because the sampling moment 606 is the moment between the two video units, the weights of the unit feature 603 and the unit feature 604 are both 0.5. That is, the server may add and average the elements at the same positions in the two unit features, to obtain the sampling feature. As shown in part (b) of FIG. 6, if the moment indicated by the sampling moment 608 is the second 6.3, when sampling is performed at this moment, the weight corresponding to the unit feature 609 is 1−dec(t$_n$), where dec( ) means taking a decimal, t$_n$ represents a sampling moment, that is, the weight corresponding to the unit feature 609 is 0.7, and the weight corresponding to the unit feature 610 is dec(t$_n$), namely, 0.3. The server respectively multiplies the unit feature 609 and the unit feature 610 by the features corresponding to them, and then adds the two weighted features, to obtain the sampling feature.

In a possible implementation, the server performs sampling by constructing a sampling matrix. For example, the server may construct a sampling matrix based on the sampling moments corresponding to the at least two video clips and the position information of the at least two video clips in the video; and multiply the sampling matrix by the initial clip features of the at least two video clips, to obtain a sampling feature matrix, one feature in the sampling feature matrix being used for representing a sampling feature of one video clip. Specifically, the foregoing sampling process may be expressed as the following formula (2), and elements in the sampling matrix may be determined based on the following formula (3):

$$F''_v = W_1 \otimes F'_v \tag{2}$$

$$W_1[t] = \begin{cases} 1 - dec(t_n), & t = \lfloor t_n \rfloor \\ dec(t_n), & t = \lfloor t_n \rfloor + 1 \\ 0, & \text{otherwise} \end{cases} \tag{3}$$

where F'$_v$ represents a unit feature sequence corresponding to the video; $\otimes$ represents the matrix multiplication; W$_1$ represents the sampling matrix, and W$_1 \in \mathbb{R}^{T \times S \times N \times T}$; T represents the start moment of the video clip, and S represents the duration of the video clip, then (T×S) represents the position of the video clip in the video; N represents the quantity of the sampling moments; t$_n$ represents the sampling moment; dec(t$_n$) means taking a decimal for t$_n$; and $\lfloor t_n \rfloor$ means rounding down, that is, taking the integer part of t$_n$. During the convolution operation, the sampling matrix W$_1$ may determine, based on positions of the video clips in the video, the unit features included in the video clips, that is, determine the initial unit features of the video units; and perform sampling based on the initial unit features of the video clips, to obtain the sampling feature matrix F''$_v$.

In this embodiment of this application, the server may perform dimension reduction on the sampling features of the at least two video clips, to obtain the clip features of the at least two video clips. In a possible implementation, the server may convolve the sampling feature matrix by using a three-dimensional convolutional layer, to perform dimension reduction on the sampling features of the video clips in the sampling time sequence dimension. The foregoing dimension reduction process may be expressed as the following formula (4):

$$F_{vp} = \text{Conv3}d(F''_v) \quad (4)$$

where $F''_v$ represents the sampling feature matrix; Conv3d( ) represents a three-dimensional convolution operation; and $F_{vp}$ is a clip feature matrix, one feature in $F_{vp}$ being used for representing the clip feature of one video clip.

Figure 7:
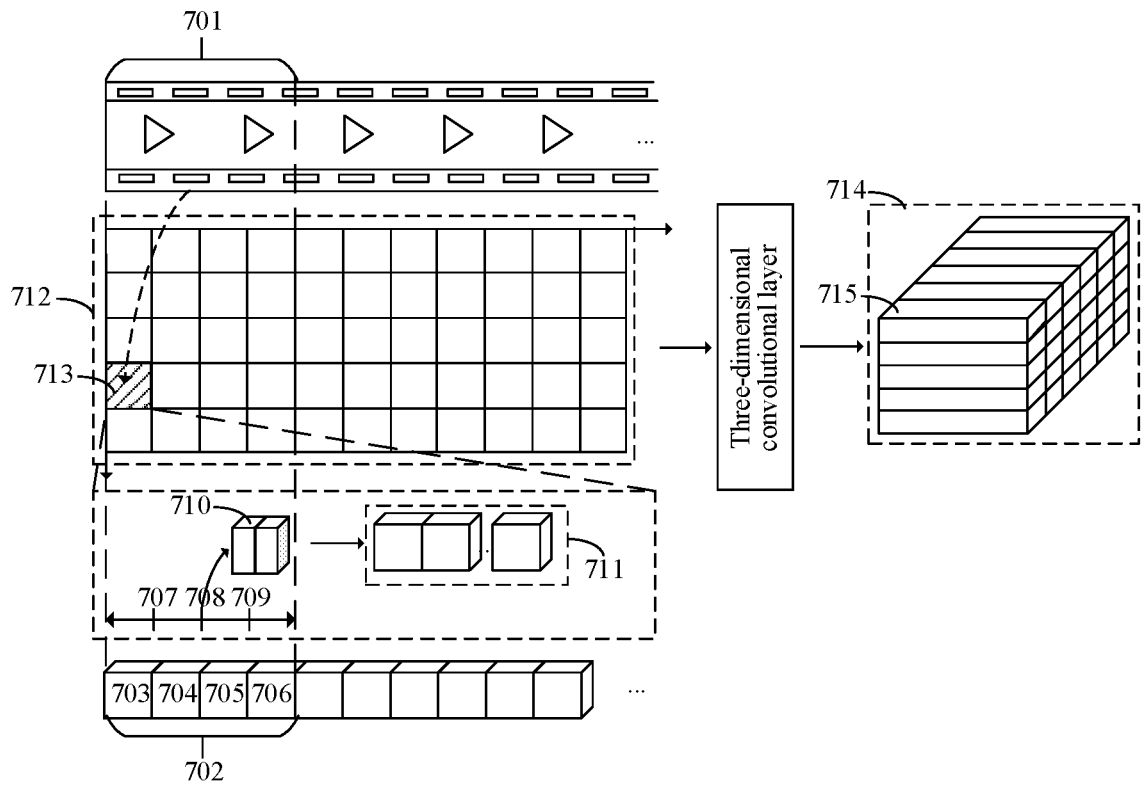
FIG. 7 is a schematic diagram of a clip feature obtaining method according to an embodiment of this application.

FIG. 7 is a schematic diagram of a clip feature obtaining method according to an embodiment of this application. With reference to FIG. 7, the foregoing clip feature obtaining method is described. In a possible implementation, for the video clip 701, an initial clip feature 702 thereof includes unit features 703, 704, 705, and 706, and the initial unit feature 702 corresponds to sampling moments 707, 708, and 709. An example in which sampling is performed at the sampling moment 708 is used. The unit features 704 and 705 may be summed and averaged to obtain a sampling feature 710 corresponding to the sampling moment 708, and then a sampling feature 711 of the video clip 701 is be obtained based on the sampling feature corresponding to each sampling moment. The server constructs a feature map 712 based on the position information of the video clips in the video and the sampling features of the video clips. The horizontal direction of the feature map is the start moments of the video clips, the vertical direction is the durations of the video clips, and one position is used for storing the sampling feature of one video clip. For example, a position 713 represents the sampling feature of a video clip of which the start moment is the $0^{th}$ second and the duration is four seconds.

Each position in the feature map 712 stores a sampling feature of a video clip, and a sampling feature matrix $F''_v$ is obtained. Dimension reduction is performed on the sampling feature matrix $F''_v$ by using a three-dimensional convolutional layer, to obtain a clip feature matrix $F_{vp}$, that is, a matrix 714. In the matrix 714, a feature 715 represents a clip feature of a video clip.

The foregoing steps 502 and 503 are that the server acquires the clip features of the at least two video clips based on the unit features of the video units included in the at least two video clips. In this embodiment of this application, feature extraction is performed on the unit features to obtain clip features. On one hand, the unit features of the video units and the time sequence relationship between the unit features can be fused in the clip features; on the other hand, video clips of different durations all correspond to clip features of the same dimension through sampling, which facilitates the model in performing subsequent operations based on the clip features.

504: The server acquires the text feature of the target text.

The target text is a piece of text used for describing a video clip, for example, a piece of text entered by a user when performing video clip retrieval.

In a possible implementation, the server acquires the one-hot code of each word in the target text, and maps the one-hot code of each word to a word vector by using an Embed (word embedding) layer. The Embed layer may be expressed as a fully-connected layer, and the server multiplies the one-hot code of each word by a coefficient matrix of the fully-connected layer, to obtain the word vector of each word, thereby obtaining a vector representation of the target text. The server may input the vector representation of the target text into a gate recurrent unit (GRU, which is a recurrent neural network), and the recurrent neural network extracts a text feature of the target text based on the vector representation of the target text. The foregoing description of the method for obtaining the text feature of the target text is only an exemplary description, and the specific method for obtaining the text feature is not limited in this embodiment of this application.

In this embodiment of this application, the description is made by using the execution sequence of first acquiring the clip features of the video clips, and then acquiring the text feature of the target text. In some embodiments, the step of acquiring the text feature may alternatively be performed first, and then the step of acquiring the clip features may be performed, or the two steps may be performed simultaneously. This is not limited in this embodiment of this application.

505: The server performs feature fusion on the clip features of the at least two video clips with a text feature of a target text respectively, to obtain fused clip features of the at least two video clips.

In a possible implementation, the server may perform cross-modal feature fusion on the clip features and the text feature by using the feature fusion unit in the video recognition model. First, the server constructs a first feature matrix corresponding to the video, that is, the clip feature matrix $F_{vp}$ in step 503, based on the clip features of the at least two video clips and the position information of the at least two video clips in the video. In step 503, the clip feature matrix $F_{vp}$ can be directly obtained through matrix convolution, then the clip feature matrix $F_{vp}$ does not need to be constructed again herein. If the clip features are obtained based on another manner, a clip feature matrix $F_{vp}$ needs to be constructed herein. Subsequently, the server performs dimension extension on the text feature based on a dimension of the first feature matrix, to obtain an extended matrix, a dimension of the extended matrix being the same as that of the first feature matrix, to facilitate feature fusion. Finally, the server performs feature fusion on the first feature matrix and the extended matrix, to obtain the fused clip features of the at least two video clips. For example, the server multiplies elements at the same positions respectively in the first feature matrix and the extended matrix, to obtain an intermediate feature matrix; and performs pooling on the intermediate feature matrix, to obtain a second feature matrix, one feature in the second feature matrix being used for representing the fused clip feature of one video clip. Specifically, the foregoing feature fusion process is described by using an example in which the feature fusion is performed by using the bilinear pooling method. In a possible implementation, the server may input the features of two modalities into a linear layer, that is, the fully-connected layer, multiply elements at the same positions in the linearly transformed features of the two modalities to obtain an intermediate feature matrix, and perform pooling on the intermediate feature matrix, to obtain a second feature matrix. The foregoing bilinear pooling feature fusion method may be expressed as the following formula (5):

$$F_{qp} = \text{SumPool}((W_{vp}^T F_{vp}) \cdot (W_q^T \text{Tile}(F_q)), K) \quad (5)$$

where $W_{vp}^T$ and $W_q^T$ are learnable parameters, which may be expressed as two fully-connected layers, and parameter values in each fully-connected layer may be determined in a model training process; $F_{vp}$ represents the first feature matrix corresponding to the video; $F_q$ represents the text feature of the target text, and $\text{Tile}(F_q)$ means replicating the text feature $F_q$ along the T dimension and the S dimension respectively; · means multiplying elements at the same positions in the two matrices; SumPool(x, K) means using a sliding window of a size K to perform sum pooling on x; and $F_{ap}$ represents the second feature matrix.

506: The server obtains first attention weights of the at least two video clips based on the fused clip features of the at least two video clips.

The first attention weight is used for indicating a matching degree between a video clip and the target text. In this embodiment of this application, the value of the first attention weight is in a positive correlation with the degree of matching between the video clip and the target text.

In a possible implementation, the server performs a convolution operation on the second feature matrix obtained after feature fusion at least once by using at least one two-dimensional convolutional layer in the video recognition model, to obtain the first attention matrix. Certainly, the server may alternatively normalize results of the convolution operation, and use the normalized matrix as the first attention matrix, one element in the first attention matrix being used for representing the first attention weight of one video clip. The method for obtaining the first attention matrix may be expressed as the following formula (6):

$$Att_p = \text{Soft max}(\text{Conv2d}(F_{ap})) \qquad (6)$$

where $F_{ap}$ represents the second feature matrix; Conv-2d( ) represents the two-dimensional convolution operation; and Soft max( ) represents a normalization function.

507: The server acquires, from the at least two video clips and according to the first attention weights, a video clip whose matching degree with the target text meets a reference condition, as a target video clip in the video that is associated with the target text.

The reference condition may be set by the developer, and this is not limited in this embodiment of this application. For example, the reference condition may be set to determining the video clip with the highest first attention weight as the target video clip, or may be set to determining the video clip with the first attention weight greater than a weight threshold as the target video clip.

According to the technical solution provided in this embodiment of this application, unit features of the video unit dimension are acquired, and clip features of video clips are determined according to the unit features, so that the acquired clip features integrate the features of a plurality of video units and the time sequence correlation between the video units; and then the clip features of the video clips and a text feature of a target text are fused. The features of video clip dimensions and the time sequence correlation between the video clips are fully used in the feature fusion process, so that more accurate attention weights can be acquired based on the fused features. The attention weights are used to represent degrees of matching between the video clips and the target text, and then a target video clip matching the target text can be positioned more accurately when video clip positioning is performed based on the attention weights.

Figure 8:
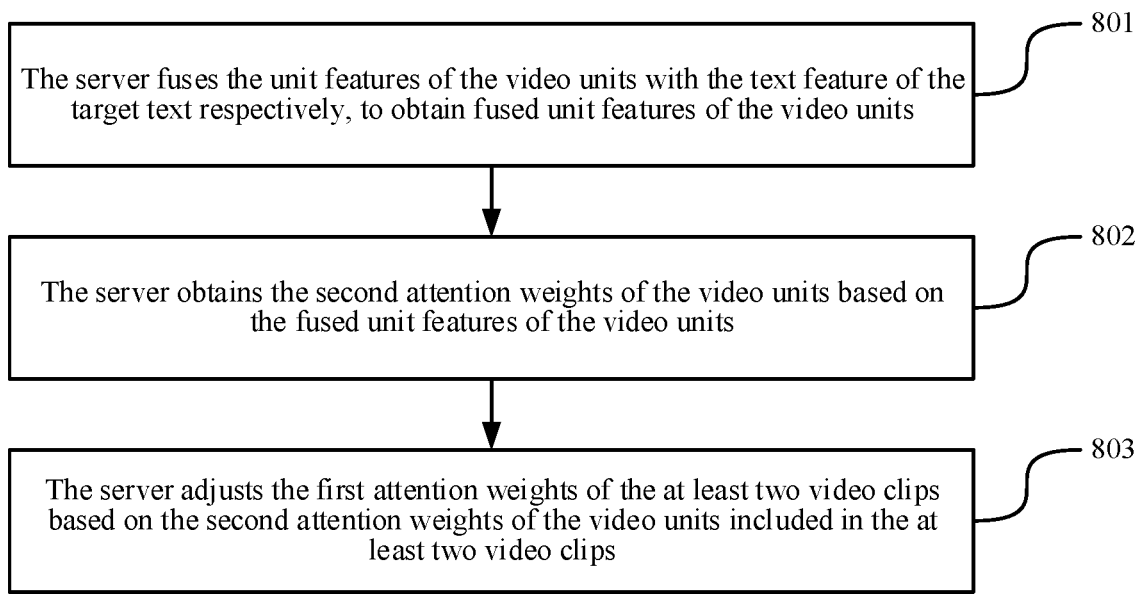
FIG. 8 is a schematic diagram of a method for adjusting first attention weights according to an embodiment of this application.

The foregoing embodiment mainly describes the process of performing video clip positioning based on the features of the video clip dimension. In this embodiment of this application, the degrees of matching between the video units and the target text may alternatively be obtained, the first attention weights of the video clips are adjusted based on the degrees of matching between the video units and the target text, and video clip positioning is performed based on the adjusted first attention weights. FIG. 8 is a schematic diagram of a method for adjusting first attention weights according to an embodiment of this application. Referring to FIG. 8, the method may include the following steps:

801: The server fuses the unit features of the video units with the text feature of the target text respectively, to obtain fused unit features of the video units.

In a possible implementation, after obtaining the unit features of the video units, the server may perform sampling and dimension reduction on the unit features, so that the unit features are easier to be understood by the video recognition model. An example in which unit features of video units with a duration of one second are processed is used. The server may multiply the sampling matrix $W_2$ by the unit feature sequence $F'_v$ corresponding to the video, to sample the unit features. Because the duration of each video unit is one second, the sampling matrix $W_2 \in \mathbb{R}^{T \times 1 \times N \times T}$. The server inputs the sampling results into the three-dimensional convolutional layer in the video recognition model, and the three-dimensional convolutional layer performs dimension reduction on the sampling results to obtain the processed unit feature sequence $F_{vc}$. One feature in the unit feature sequence $F_{vc}$ is a processed unit feature. The three-dimensional convolutional layer is the same as the three-dimensional convolutional layer applied for performing dimension reduction on the clip features in step 503.

In a possible implementation, the server may extend the dimension of the text feature based on the dimension of the unit feature sequence $F_{vc}$, and perform feature fusion on the extended text feature and the unit feature sequence $F_{vc}$, to obtain a fused unit feature sequence $F_{ac}$, one feature in the fused unit feature sequence $F_{ac}$ being a fused unit feature based on one video unit. The method for obtaining the fused unit features is the same as the method for obtaining the fused clip features in step 505, and details are not described herein again. The method for obtaining the fused unit features may be expressed as the following formula (7):

$$F_{ac} = \text{SumPool}((W_{vc}^T F_{vc}) \cdot (W_q^T \text{Tile}(F_q)), K) \qquad (7)$$

where $W_{vc}^T$ and $W_q^T$ are learnable parameters, which may be expressed as two fully-connected layers, and parameter values in each fully-connected layer may be determined in a model training process; $F_{vc}$ represents the first feature matrix corresponding to the video; $F_q$ represents the text feature of the target text, and $\text{Tile}(F_q)$ means replicating the text feature $F_q$ along the T dimension and the S dimension respectively; · means multiplying elements at the same positions in the two matrices; SumPool(x, K) means using a sliding window of a size K to perform sum pooling on x; and $F_{ac}$ represents the fused unit feature sequence.

802: The server obtains the second attention weights of the video units based on the fused unit features of the video units.

In a possible implementation, the server can perform two-dimensional convolution on the fused unit feature sequence $F_{ac}$, normalize the convolution results, and then multiply the normalized matrix by the global feature matrix of the video to obtain a second attention matrix, one element in the second attention matrix being used for representing the second attention weight of one video unit. The global feature matrix of the video may be obtained based on the clip feature matrix obtained in step 503 and the first attention matrix obtained in step 506, and may be specifically expressed as the following formula (8):

$$F_p^{global} = F_{vp} \otimes Att_p \qquad (8)$$

where $F_p^{global}$ represents the global feature matrix; $F_{vp}$ represents the clip feature matrix; $Att_p$ represents the first attention matrix; and $\otimes$ represents the matrix multiplication.

The method for obtaining the second attention matrix may be expressed as the following formula (9):

$$Att_c = \text{Soft max}(Conv2d(F_{ac}))F_c^{global} \quad (9)$$

where $Att_c$ represents the second attention matrix; $F_{ac}$ represents the fused unit feature sequence; Conv2d( ) represents the two-dimensional convolution operation; $F_c^{global}$ represents the global feature matrix; and Soft max( ) represents the normalization function.

The foregoing step 801 and step 802 are steps of acquiring the second attention weights of the at least two video units. In this embodiment of this application, the attention weights at the video unit level are obtained and subsequent video clip positioning is performed based on the multi-level attention weights, thereby improving the accuracy of the video clip positioning result.

803: The server adjusts the first attention weights of the at least two video clips based on the second attention weights of the video units included in the at least two video clips.

In a possible implementation, for any one of the at least two video clips as the target video clip, the server determines a target video unit corresponding to the central moment of the target video clip from the video units included in the target video clip; and adjusts the first attention weight of the target video clip based on the second attention weight corresponding to the target video unit. The foregoing process of adjusting the first attention weights may be expressed as the following formula (10):

$$Att'_p(i) = Att_p(i) + \alpha Att_c(j) \quad (10)$$

where i represents the $i^{th}$ video clip, $Att_p$ (i) represents the first attention weight of the $i^{th}$ video clip; j represents the $j^{th}$ video unit, and the specific value of j is $T_i + \frac{1}{2}S_i$, $T_i$ is the start moment of the $i^{th}$ video clip, $S_i$ is the duration of the $i^{th}$ video clip, and $Att_c$ (j) represents the second attention weight of the $j^{th}$ video unit; $Att'_p(i)$ represents the adjusted first attention weight; and $\alpha$ represents a hyperparameter, where the specific value thereof may be set by the developer, and this is not limited in this embodiment of this application.

According to the technical solution provided in this embodiment of this application, the video recognition model is extended into a multi-level structure, that is, including a data processing branch of a video clip level and a data processing branch of a video unit level; obtain the second attention weight of the video unit dimension is obtained, and the second attention weight is used to adjust the first attention weight of the video clip dimension, to improve the accuracy of the first attention weight, thereby improving the accuracy of the video clip positioning result.

The above embodiments describe the process of perform video clip positioning based on a natural language description. In this embodiment of this application, after the target video clip is determined, the target video clip may be displayed.

In a possible implementation, the server may send the video clip positioning result to the terminal used by the user, and the terminal displays annotation information on a playback interface of the video, the annotation information being used for indicating a start moment and an end moment of the target video clip. For example, when a user watches a video on a terminal and has a video clip search requirement, the user may enter a target text in a search region on the playback interface of the video, and click a search control; and the terminal generate a video clip positioning request in response to detecting the user's triggering operation on the search control. The video clip positioning request includes the video identifier and target text of the video. Certainly, the terminal may alternatively generate the video clip positioning request in other manners, which is not limited in this embodiment of this application. The terminal sends the video clip positioning request to the server, and the server positions a target video clip in the video that matches the target text. The server may send the start moment and the duration of the target video clip to the terminal. The terminal may annotate the start moment and the end moment of the target video clip in the playback progress bar of the playback interface based on the start moment and the duration of the target video clip.

Figure 9:
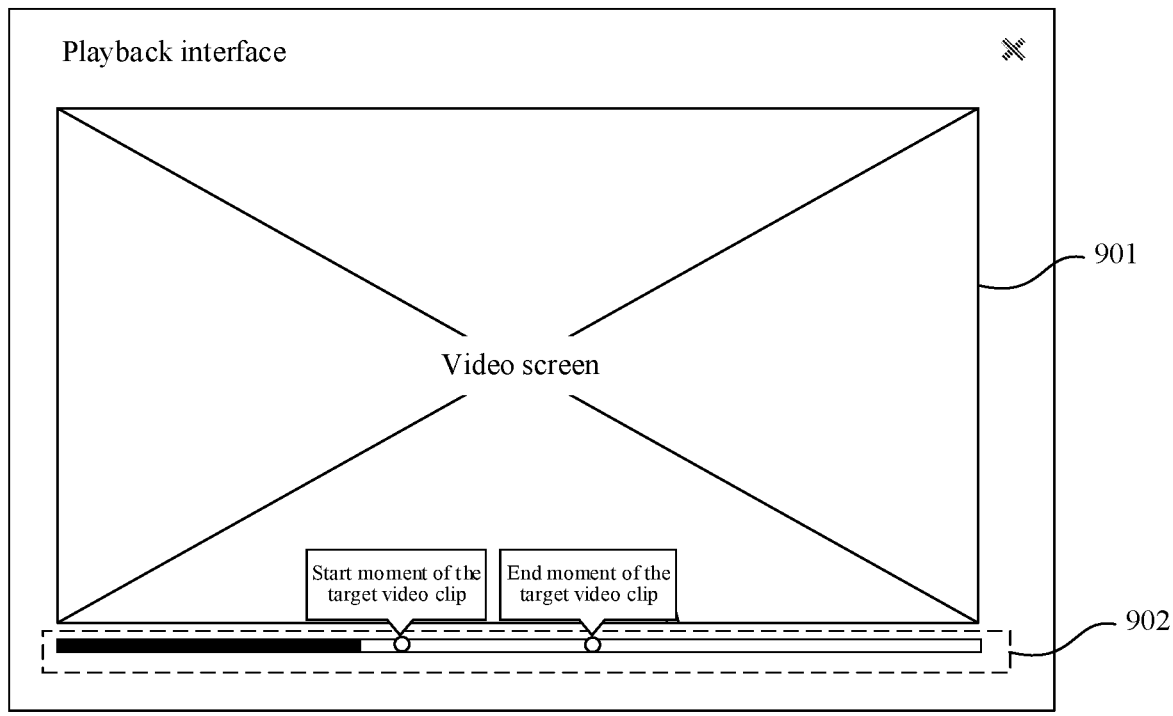
FIG. 9 is a schematic diagram of a display manner of a target video clip according to an embodiment of this application.

FIG. 9 is a schematic diagram of a display manner of a target video clip according to an embodiment of this application. The playback interface includes a video playback region 901 and a video playback progress bar 902. The terminal may display annotation information in the video playback progress bar 902, the annotation information being used for indicating the start moment and end moment of the target video clip. In a possible implementation, the terminal may alternatively jump to the target video clip for playback, that is, jump from the current playback moment to the start moment of the target video clip, and start playing the video from the start moment. In a possible implementation, the server may alternatively cut out the target video clip from the video, generate a playback link of the target video clip, and send the playback link to the terminal. The terminal displays the link or hyperlink of the target video clip on the playback interface of the video, the link or hyperlink being used for providing the function of playing the target video clip.

Figure 10:
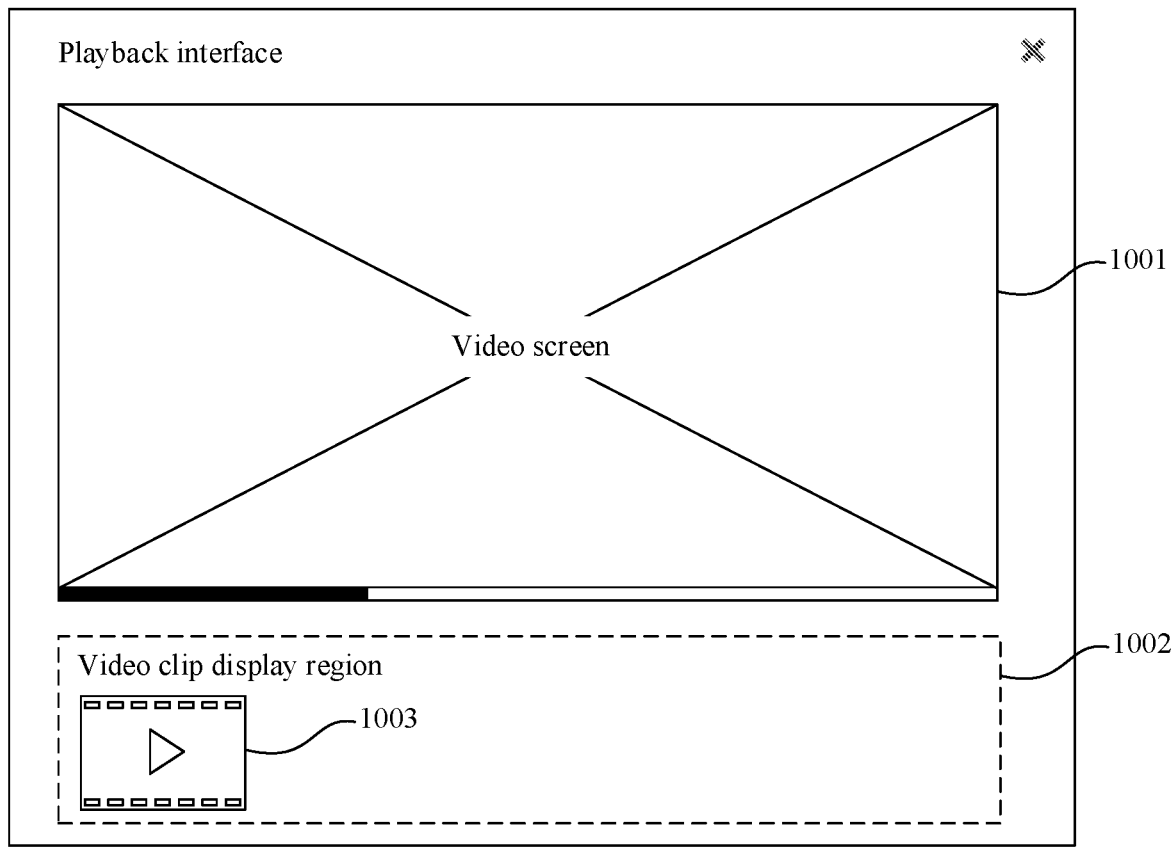
FIG. 10 is a schematic diagram of another display manner of a target video clip according to an embodiment of this application.

FIG. 10 is a schematic diagram of another display manner of a target video clip according to an embodiment of this application. The playback interface includes a video playback region 1001 and a video clip display region 1002. The position of the video clip display region 1002 on the playback interface is not limited in this embodiment of this application. In this embodiment of this application, an example in which the video clip display region 1002 is below the video playback region 1001 is used. The terminal may display a playback entry 1003 of the target video clip in the video clip display region 1002 in the form of a hyperlink, and in response to a click on the playback entry 1003 by the user, the terminal jumps to the playback interface corresponding to the target video clip, and plays the target video clip.

In this embodiment of this application, if the video clip positioning request includes no video identifier, that is, the video clip positioning is not performed on a certain video, the server matches the target text with video clips in a plurality of videos, and obtains target video clips from the plurality of videos. In a possible implementation, the server may generate a playback link for each target video clip, and display the playback link of each video clip on the terminal separately; and the user clicks each playback link to play the video clip. In a possible implementation, the server may generate a video set based on the plurality of target video clips, and send the link or hyperlink of the video set to the terminal for display. The user may view a plurality of target video clips of interest in the video set, and may further store the video set to the terminal. In this embodiment of this application, by generating the video set, both the interest of video viewing and the user experience can be improved.

In this embodiment of this application, when the user performs video clip positioning, the user only needs to provide a text for describing the video clip, without manually searching a large quantity of videos. After the server finishes the video clip positioning, the terminal displays the video clip positioning result from the server, and the user can quickly obtain the video clips of interest, which improves the efficiency of video clip positioning.

Figure 11:
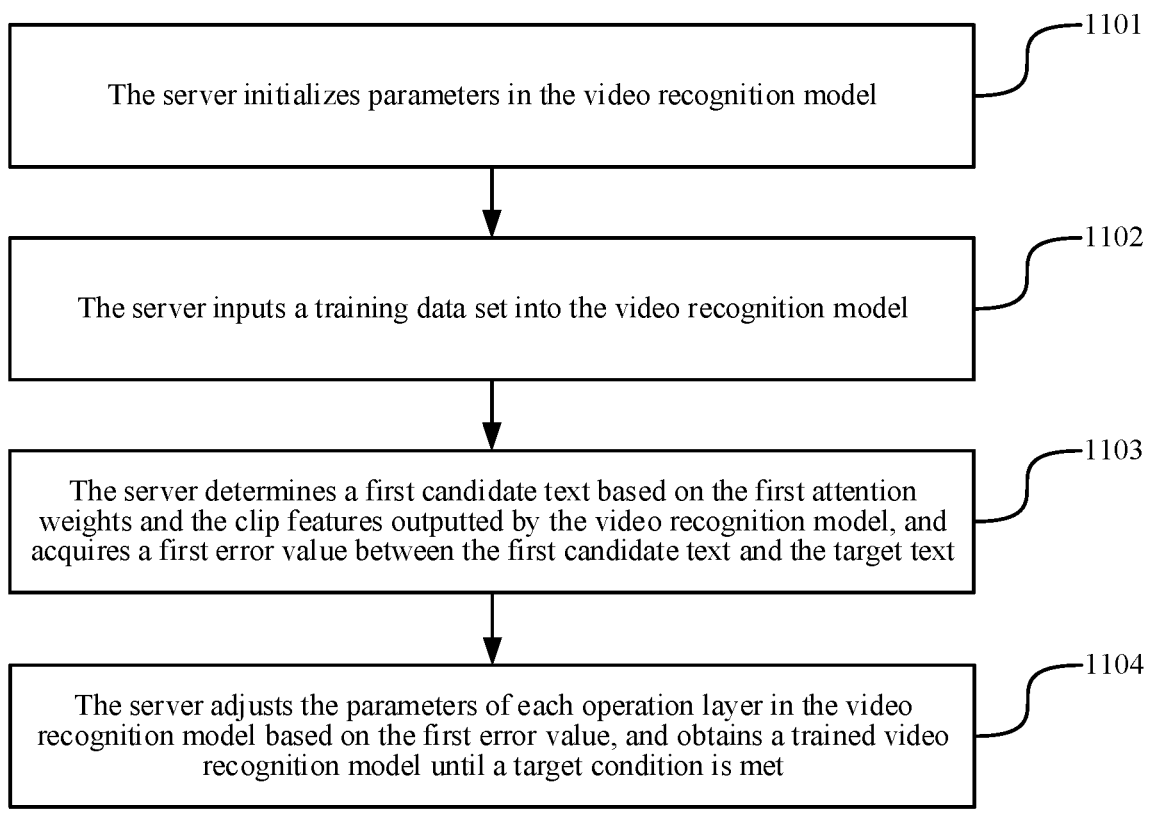
FIG. 11 is a flowchart of a video recognition model training method according to an embodiment of this application.

The foregoing embodiment mainly describes the process of using the video recognition model to perform video clip positioning and displaying the video clip positioning result. Before the video clip positioning, the video recognition model needs to be trained to adjust parameters of each operation layer in the video recognition model. In this embodiment of this application, the server may be equipped with a reconstruction module, and the reconstruction module predicts a first candidate text based on the clip features of the video clips, and adjusts parameters of the video recognition model based on an error between the first candidate text and the target text. FIG. 11 is a flowchart of a video recognition model training method according to an embodiment of this application. Referring to FIG. 11, the process may specifically include the following steps:

1101: The server initializes parameters in the video recognition model.

In a possible implementation, the server implements parameter initialization by randomly assigning values to the parameters of each convolutional layer, pooling layer, and fully-connected layer in the video recognition model. For example, the server may use a Gaussian distribution with a variance of 0.01 and an average value of 0 to perform parameter initialization the video recognition model. The specific method for initializing the model parameters is not limited in this embodiment of this application.

1102: The server inputs a training data set into the video recognition model.

The training data set may include a plurality of sample videos. The plurality of sample videos are annotated sample videos, and each sample video is annotated with corresponding text information thereof. In this embodiment of this application, model training is performed in a weak supervised manner, without the need for fine-grained annotation in time sequence, that is, there is no need to annotate the start moment, end moment and corresponding text information of each video clip, which reduces the difficulty of obtaining the training data set.

In a possible implementation, the server inputs the plurality of annotated sample videos into the video recognition model, and the video recognition model outputs, based on the degrees of matching between the video clips in the sample videos and the text information, the target video clip positioned by using the text information. The method for obtaining the target video clip is the same as the process of video clip positioning in the foregoing steps 501 to 507, and details are not described herein again.

1103: The server determines a first candidate text based on the first attention weights and the clip features outputted by the video recognition model, and acquires a first error value between the first candidate text and the target text.

In a possible implementation, the server performs a weighting operation on the clip features of the at least two video clips based on the first attention weights of the at least two video clips, to obtain weighted clip features of the at least two video clips. Specifically, the server may multiply the clip feature matrix by the first attention matrix to obtain a global feature matrix $F_p^{global}$ one feature in the global feature matrix $F_p^{global}$ being the weighted clip feature of one video clip.

Subsequently, the server extracts features from the weighted clip features of the at least two video clips by using a long short-term memory (LSTM) network, and determines a first candidate text based on the extracted features. In a possible implementation, when performing prediction on the $m^{th}$ word in the $m^{th}$ first candidate text, the server may splice a CloVe word vector of the $(m-1)^{th}$ word, and an LSTM hidden layer feature of the $(m-1)^{th}$ word, and the global feature matrix, and the LSTM network determines the hidden layer feature of the $m^{th}$ word based on the splicing result, and determines the $m^{th}$ word based on the acquired hidden layer feature. The foregoing method for obtaining the hidden layer feature of the $m^{th}$ word may be expressed as the following formula (11):

$$h_m = \text{LSTM}(\text{Concat}(F_p^{global}, h_{m-1}, e_{m-1})) \quad (11)$$

where $F_p^{global}$ represents the global feature matrix; $h_{m-1}$ represents the hidden layer feature of the $(m-1)^{th}$ word; $e_{m-1}$ represents the CloVe word vector of the $(m-1)^{th}$ word; $\text{Concat}(F_p^{global}, h_{m-1}, e_{m-1})$ represents splicing $F_p^{global}$, $h_{m-1}$, and $e_{m-1}$, for example, connect $F_p^{global}$, $h_{m-1}$, and $e_{m-1}$ in an end-to-end manner for splicing; and $h_m$ represents the hidden layer feature of the $m^{th}$ word.

Finally, the server acquires an error value between the first candidate text and the target text. In a possible implementation, the first error value may be obtained by generating a loss function, which may be specifically expressed as the following formula (12):

$$L_p^{cap} = -\frac{1}{M} \sum_{m=1}^{M} \log P(w_m | F_p^{global}, h_{m-1}, w_1, \ldots, w_{m-1}) \quad (12)$$

where M represents the quantity of words in the first candidate text, m represents the word sequence number; $F_p^{global}$ represents the global feature matrix; $h_{m-1}$ represents the hidden layer feature of the $(m-1)^{th}$ word; and $w_{m-1}$ represents the encoded representation of the $(m-1)^{th}$ word.

1104: The server adjusts the parameters of each operation layer in the video recognition model based on the first error value, and obtains a trained video recognition model until a target condition is met.

In a possible implementation, the server may compare the acquired first error value with an error threshold, and when the first error value is greater than the error threshold, the computer device backpropagates the first error value to the video recognition model, and solves the parameters in the video recognition model based on the first error value. The parameters include parameters corresponding to a plurality of convolution kernels, parameters corresponding to pooling layers, parameters corresponding to each fully-connected layer, and the like. The error threshold may be set by the developer.

In this embodiment of this application, the target condition may be set by the developer. In a possible implementation, the target condition may be set to that the quantity of obtained correct output results reaches a target quantity, where the target quantity may be set by the developer. When the first error value is less than the error threshold, it is considered that the target recognition result obtained by the server is correct, and the server continues to read the next sample video, and performs step 1103. If the quantity of correct output results obtained by the server reaches the target quantity, that is, when the target condition is met, it is considered that the training of the video recognition model is completed.

The foregoing description of the video recognition model training method is only an exemplary description, and the specific method for training the video recognition model is not limited in this embodiment of this application.

In a possible implementation, when the video recognition model includes a data processing branch of a video clip level and a data processing branch of a video unit level, the server may further predict a second candidate text based on features at the video unit level, and determine a second error value based on the second candidate text. The method for obtaining the second error value may be expressed as the following formula (13):

$$L_c^{cap} = -\frac{1}{M}\sum_{m=1}^{M} \log P(w_m | F_c^{global}, h'_{m-1}, w_1, \ldots, w_{m-1}) \quad (13)$$

where $L_c^{cap}$ represents the second error value; $F_c^{global}$ represents the global feature matrix obtained based on the features at the video unit level; $h_{m-1}$ represents the hidden layer feature of the $(m-1)^{th}$ word; and $w_{m-1}$ represents the encoded representation of the $(m-1)^{th}$ word. The foregoing process of obtaining the second error value is the same as the process of obtaining the first error value in step 1103, and details are not described herein again.

In a possible implementation, a total error value $L^{cap}$ may be obtained based on the first error value $L_p^{cap}$ and the second error value $L_c^{cap}$, and the parameters in the video recognition model may be adjusted based on the total error value. The total error value $L^{cap}$ may be expressed as the following formula (14):

$$L^{cap} = L_p^{cap} + \lambda L_c^{cap} \quad (14)$$

where $L_p^{cap}$ represents the first error value, and $L_c^{cap}$ represents the second error value, and a value of $\lambda$ may be set by the developer, which is not limited in this embodiment of this application.

Figure 12:
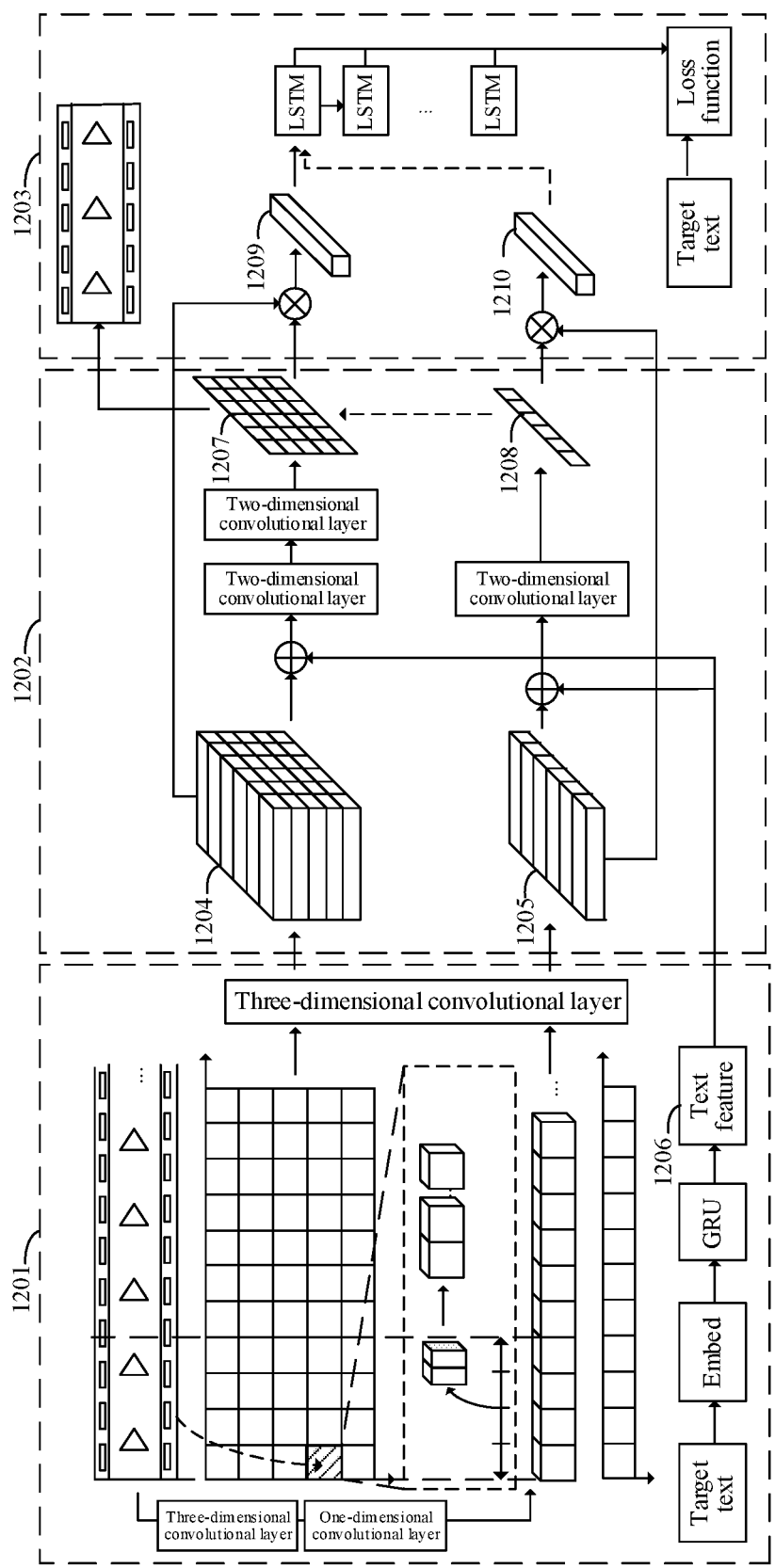
FIG. 12 is a schematic diagram of a data processing process of a video recognition model according to an embodiment of this application.

FIG. 12 is a schematic diagram of a data processing process of a video recognition model according to an embodiment of this application. With reference to FIG. 12, the foregoing process is described. In a possible implementation, the data processing process of the video recognition model may include a feature extraction stage 1201, an attention stage 1202 and a reconstruction stage 1203. At the feature extraction stage 1201, features 1204 of the video clip dimension, features 1205 of the video unit dimension, and a text feature 1206 may be obtained by using at least one convolutional layer; and at the attention stage 1202, feature fusion is performed on the text feature and the video features, and a convolution operation is performed on the fused features by using at least one two-dimensional convolutional layer, to obtain first attention weights 1207 of the video clip dimension and second attention weights 1208 of the video unit dimension. In the testing process, the first attention weights 1207 may be adjusted based on the second attention weights 1208, and a target video clip 1209 may be predicted based on the adjusted second attention weights. In the model training process, a first global feature 1209 of the video clip dimension may be obtained based on the features 1204 of the video clip dimension and the first attention weights 1207, a second global feature 1210 of the video unit dimension may be obtained based on the features 1205 of the video unit dimension and the second attention weights 1208, an LSTM network of parameter sharing may be used to perform candidate text prediction respectively based on the first global feature 1209 and the second global feature 1210, and an error between the candidate text and the target text is determined by using a loss function. In this embodiment of this application, model training is performed based on data at the video clip level and the video unit level, and a video recognition model with better model performance can be obtained.

All the technical solutions may be combined randomly to form embodiments of this application. Details are not described herein again.

Figure 13:
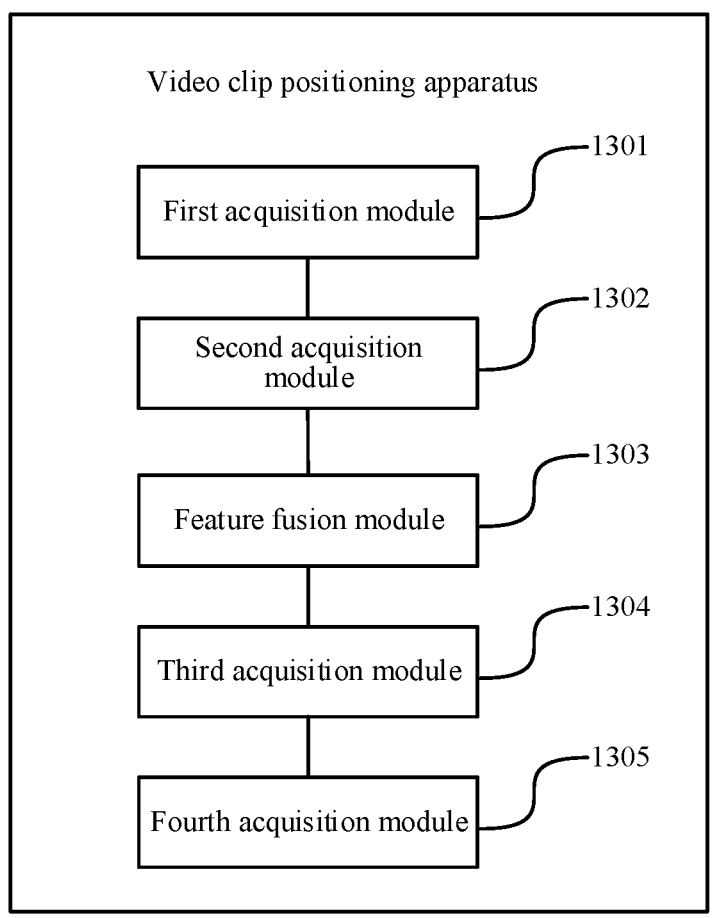
FIG. 13 is a schematic structural diagram of a video clip positioning apparatus according to an embodiment of this application.

FIG. 13 is a schematic structural diagram of a video clip positioning apparatus according to an embodiment of this application. Referring to FIG. 13, the apparatus includes:

a first acquisition module 1301, configured to extract features from video units included in at least two video clips in a video, to obtain unit features of the video units;

a second acquisition module 1302, configured to acquire clip features of the at least two video clips based on the unit features of the video units included in the at least two video clips;

a feature fusion module 1303, configured to perform feature fusion on the clip features of the at least two video clips with a text feature of a target text respectively, to obtain fused clip features of the at least two video clips;

a third acquisition module 1304, configured to obtain first attention weights of the at least two video clips based on the fused clip features of the at least two video clips, the first attention weight being used for indicating a matching degree between a video clip and the target text; and a fourth acquisition module 1305, configured to acquire, from the at least two video clips and according to the first attention weights, a video clip whose matching degree with the target text meets a reference condition, as a target video clip in the video that is associated with the target text.

In a possible implementation, the second acquisition module 1302 includes:

an initial clip feature acquisition submodule, configured to determine initial clip features of the at least two video clips based on the unit features of the video units included in the at least two video clips; and a sampling submodule, configured to sample the initial clip features of the at least two video clips, to obtain the clip features of the at least two video clips.

In a possible implementation, the sampling submodule includes:

a sampling moment determining unit, configured to determine sampling moments corresponding to the at least two video clips based on durations of the at least two video clips, each video clip being corresponding to a same quantity of sampling moments; and a sampling unit, configured to sample the initial clip features of the at least two video clips based on the sampling moments corresponding to the at least two video clips, to obtain the clip features of the at least two video clips.

In a possible implementation, the sampling unit is configured to:

construct a sampling matrix based on the sampling moments corresponding to the at least two video clips and position information of the at least two video clips in the video;

multiply the sampling matrix by the initial clip features of the at least two video clips, to obtain a sampling feature matrix, one feature in the sampling feature matrix being used for representing a sampling feature of one video clip; and perform dimension reduction on the sampling features of the at least two video clips, to obtain the clip features of the at least two video clips.

In a possible implementation, the feature fusion module 1303 includes:

a text feature acquisition submodule, configured to acquire the text feature of the target text;

a matrix construction submodule, configured to construct a first feature matrix corresponding to the video based on the clip features of the at least two video clips and position information of the at least two video clips in the video;

an extension submodule, configured to perform dimension extension on the text feature based on a dimension of the first feature matrix, to obtain an extended matrix, a dimension of the extended matrix being the same as that of the first feature matrix; and a feature fusion submodule, configured to perform feature fusion on the first feature matrix and the extended matrix, to obtain the fused clip features of the at least two video clips.

In a possible implementation, the feature fusion submodule is configured to:

multiply elements at the same positions respectively in the first feature matrix and the extended matrix, to obtain an intermediate feature matrix; and perform pooling on the intermediate feature matrix, to obtain a second feature matrix, one feature in the second feature matrix being used for representing the fused clip feature of one video clip.

In a possible implementation, the third acquisition module 1304 is configured to:

perform a convolution operation on the second feature matrix at least once, to obtain a first attention matrix, one element in the first attention matrix being used for representing the first attention weight of one video clip.

In a possible implementation, the apparatus further includes:

a fifth acquisition module, configured to acquire second attention weights of the video units, the second attention weight being used for indicating a matching degree between a video unit and the target text; and an adjustment module, configured to adjust the first attention weights of the at least two video clips based on the second attention weights of the video units included in the at least two video clips.

In a possible implementation, the fifth acquisition module is configured to:

fuse the unit features of the video units with the text feature of the target text respectively, to obtain fused unit features of the video units; and obtain the second attention weights of the video units based on the fused unit features of the video units.

In a possible implementation, for the target video clip in the at least two video clips, the adjustment module is configured to:

determine a target video unit corresponding to a central moment of the target video clip from video units included in the target video clip; and adjust the first attention weight of the target video clip based on the second attention weight of the target video unit.

In a possible implementation, the apparatus further includes a display module, configured to perform any one of the following:

displaying annotation information on a playback interface of the video, the annotation information being used for indicating a start moment and an end moment of the target video clip; or displaying a link of the target video clip on the playback interface of the video, the link being used for providing a function of playing the target video clip.

In a possible implementation, the apparatus further includes:

a sixth acquisition module, configured to perform a weighting operation on the clip features of the at least two video clips based on the first attention weights of the at least two video clips, to obtain weighted clip features of the at least two video clips;

a seventh acquisition module, configured to: extract features from the weighted clip features of the at least two video clips by using an LSTM network, and determine a first candidate text based on the extracted features; and an eighth acquisition module, configured to acquire a first error value between the first candidate text and the target text.

By the apparatus provided in this embodiment of this application, unit features of the video unit dimension are acquired, and clip features of video clips are determined according to the unit features, so that the acquired clip features integrate the features of a plurality of video units and the time sequence correlation between the video units; and then the clip features of the video clips and a text feature of a target text are fused. The features of video clip dimensions and the time sequence correlation between the video clips are fully used in the feature fusion process, so that more accurate attention weights can be acquired based on the fused features. The attention weights are used to represent degrees of matching between the video clips and the target text, and then a target video clip matching the target text can be positioned more accurately when video clip positioning is performed based on the attention weights.

When the video clip positioning apparatus provided in the foregoing embodiments implements video clip positioning, the division of the foregoing functional modules is merely used as an example for illustration. In practical applications, different functional modules may be allocated to complete the foregoing functions as required, that is, an internal structure of the apparatus is divided into different functional modules, so as to complete all or some of the functions described above. In addition, the video clip positioning apparatus embodiments and the video clip positioning method embodiments provided in the foregoing embodiments belong to the same conception. For the specific implementation process, reference may be made to the method embodiments, and details are not described herein again.

Figure 14:
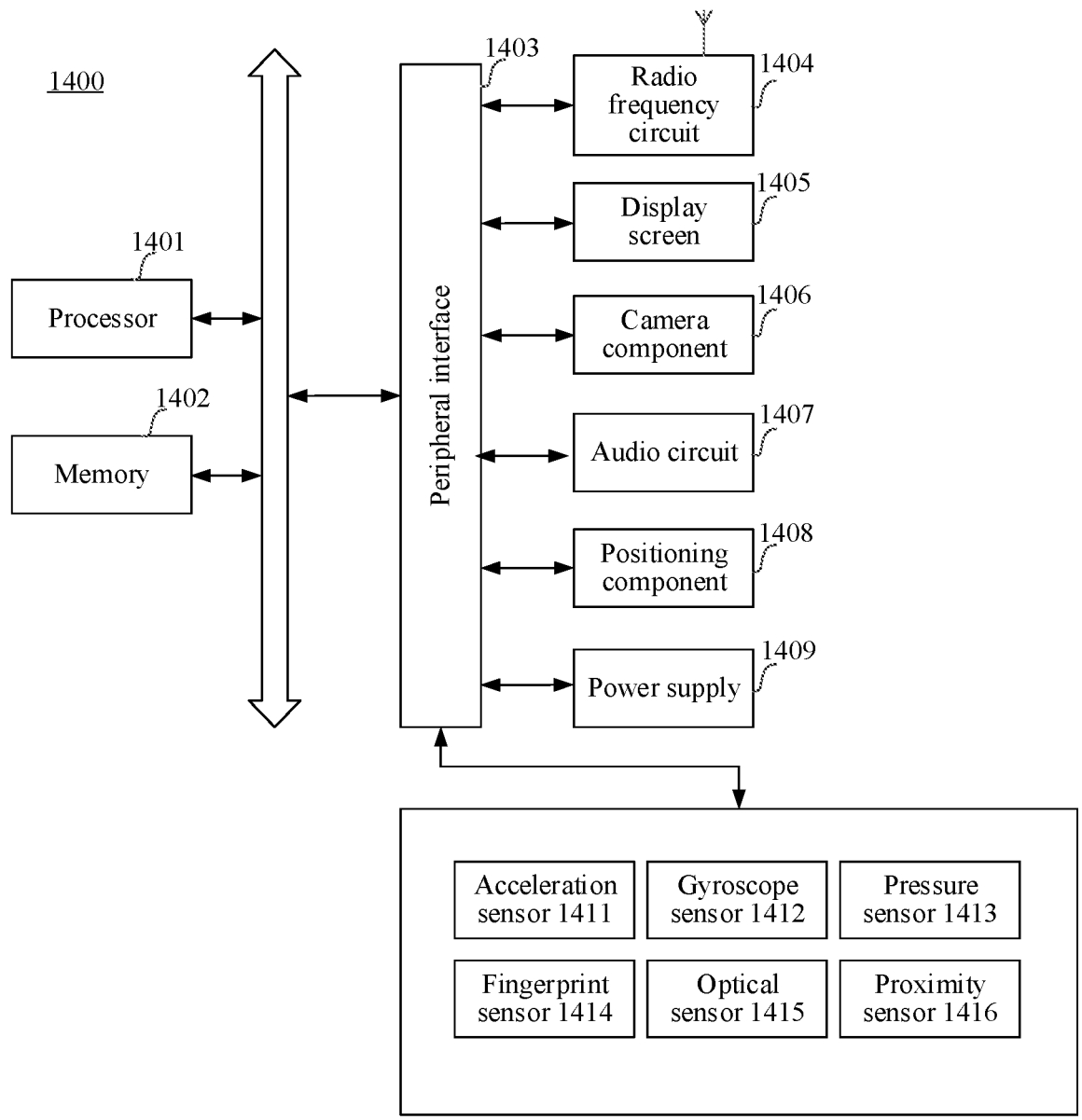
FIG. 14 is a schematic structural diagram of a terminal according to an embodiment of this application.

The computer device provided in the foregoing technical solution may be implemented as a terminal or a server. For example, FIG. 14 is a schematic structural diagram of a terminal according to an embodiment of this application. The terminal 1400 may be a smartphone, a tablet computer, a Moving Picture Experts Group Audio Layer III (MP3) player, a Moving Picture Experts Group Audio Layer IV (MP4) player, a notebook computer, or a desktop computer. The terminal 1400 may also be referred to as user equipment, a portable terminal, a laptop terminal, a desktop terminal, or another name.

Generally, the terminal 1400 includes one or more processors 1401 and one or more memories 1402.

The memory 1402 may include one or more computer-readable storage media. The computer-readable storage media may be non-transient. The memory 1402 may further include a high-speed random access memory (RAM), and a non-volatile memory such as one or more magnetic disk storage devices and a flash storage device. In some embodiments, a non-transitory computer-readable storage medium in the memory 1402 is configured to store at least one piece of program code, the at least one piece of program code being configured to be executed by the processor 1401 to implement the video clip positioning method provided in the method embodiments of this application.

In some embodiments, the terminal 1400 may further include: a peripheral interface 1403 and at least one peripheral. The processor 1401, the memory 1402, and the peripheral interface 1403 may be connected by a bus or a signal cable. Each peripheral may be connected to the peripheral interface 1403 by a bus, a signal cable, or a circuit board. Specifically, the peripheral includes: at least one of a radio frequency (RF) circuit 1404, a display screen 1405, a camera component 1406, an audio circuit 1407, a positioning component 1408, and a power supply 1409.

In some embodiments, the terminal 1400 further includes one or more sensors 1410. The one or more sensors 1410 include, but not limited to, an acceleration sensor 1411, a gyroscope sensor 1412, a pressure sensor 1413, a fingerprint sensor 1414, an optical sensor 1415, and a proximity sensor 1416.

A person skilled in the art may understand that the structure shown in FIG. 14 does not constitute a limitation to the terminal 1400, and the terminal may include more or fewer components than those shown in the figure, or some components may be combined, or a different component deployment may be used.

Figure 15:
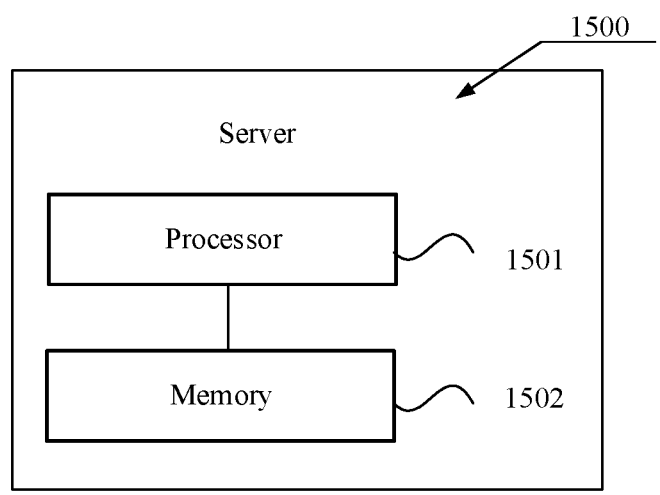
FIG. 15 is a schematic structural diagram of a server according to an embodiment of this application.

FIG. 15 is a schematic structural diagram of a server according to an embodiment of this application. The server 1500 may vary greatly according to configuration or performance, and may include one or more central processing units (CPUs) 1501 and one or more memories 1502. The one or more memories 1502 store at least one piece of program code. The at least one piece of program code is loaded by the one or more processors 1501 to implement the method provided in the foregoing method embodiments. Certainly, the server 1500 may further have a wired or wireless network interface, a keyboard, an input/output interface, and other components to facilitate input/output. The server 1500 may further include other components for implementing device functions. Details are not described herein again.

In an exemplary embodiment, a computer-readable storage medium is further provided, the storage medium being configured to store a computer program, the computer program being configured to be executed to perform the video clip positioning method in the foregoing embodiments. For example, the computer-readable storage medium may be a read-only memory (ROM), a RAM, a compact disc ROM (CD-ROM), a magnetic tape, a floppy disk, an optical data storage device, or the like.

An embodiment of this application further provides a computer program product including instructions, the computer program product, when run on a computer, causing the computer to perform the method provided in the foregoing embodiments.

In an exemplary embodiment, a computer program product is further provided, including at least one piece of program code, the at least one piece of program code being stored in a computer-readable storage medium. A processor of a computer device reads the at least one piece of program code from the computer-readable storage medium, and the processor executes the at least one piece of program code, to cause the computer device to implement the operations performed in the video clip positioning method.

A person of ordinary skill in the art may understand that all or some of steps of the embodiments may be implemented by hardware or a program instructing related hardware. The program may be stored in a computer-readable storage medium. The storage medium mentioned above may be a ROM, a magnetic disk, an optical disc, or the like.

The foregoing descriptions are merely embodiments of this application, but are not intended to limit this application. Any modification, equivalent replacement, or improvement made within the spirit and principle of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A video clip positioning method performed by a computer device, the method comprising:
   extracting features from video units comprised in at least two video clips in a video, to obtain unit features of the video units;
   acquiring clip features of the at least two video clips based on the unit features of the video units comprised in the at least two video clips;
   performing feature fusion on the clip features of the at least two video clips with a text feature of a target text respectively, to obtain fused clip features of the at least two video clips;
   obtaining first attention weights of the at least two video clips based on the fused clip features of the at least two video clips, each first attention weight being used for indicating a matching degree between a respective video clip and the target text; and
   acquiring, from the at least two video clips and according to the first attention weights, a video clip whose matching degree with the target text meets a reference condition, as a target video clip in the video that is associated with the target text.

2. The method according to claim 1, wherein the acquiring clip features of the at least two video clips based on the unit features of the video units comprised in the at least two video clips comprises:
   determining initial clip features of the at least two video clips based on the unit features of the video units comprised in the at least two video clips; and
   sampling the initial clip features of the at least two video clips, to obtain the clip features of the at least two video clips.

3. The method according to claim 2, wherein the sampling the initial clip features of the at least two video clips, to obtain the clip features of the at least two video clips comprises:
   determining sampling moments corresponding to the at least two video clips based on respective durations of the at least two video clips, each video clip corresponding to a same quantity of sampling moments; and
   sampling the initial clip features of the at least two video clips based on the sampling moments corresponding to the at least two video clips, to obtain the clip features of the at least two video clips.

4. The method according to claim 3, wherein the sampling the initial clip features of the at least two video clips based on the sampling moments corresponding to the at least two video clips, to obtain the clip features of the at least two video clips comprises:

constructing a sampling matrix based on the sampling moments corresponding to the at least two video clips and position information of the at least two video clips in the video;

multiplying the sampling matrix by the initial clip features of the at least two video clips, to obtain a sampling feature matrix, one feature in the sampling feature matrix being used for representing a sampling feature of one video clip; and performing dimension reduction on the sampling features of the at least two video clips, to obtain the clip features of the at least two video clips.

5. The method according to claim 1, wherein the performing feature fusion on the clip features of the at least two video clips with a text feature of a target text respectively, to obtain fused clip features of the at least two video clips comprises:

acquiring the text feature of the target text;

constructing a first feature matrix corresponding to the video based on the clip features of the at least two video clips and position information of the at least two video clips in the video;

performing dimension extension on the text feature based on a dimension of the first feature matrix, to obtain an extended matrix of the target text, a dimension of the extended matrix being the same as that of the first feature matrix; and performing feature fusion on the first feature matrix and the extended matrix, to obtain the fused clip features of the at least two video clips.

6. The method according to claim 5, wherein the performing feature fusion on the first feature matrix and the extended matrix, to obtain the fused clip features of the at least two video clips comprises:

multiplying elements at the same positions respectively in the first feature matrix and the extended matrix, to obtain an intermediate feature matrix; and performing pooling on the intermediate feature matrix, to obtain a second feature matrix, one feature in the second feature matrix being used for representing the fused clip feature of a corresponding one of the at least two video clips.

7. The method according to claim 6, wherein the obtaining first attention weights of the at least two video clips based on the fused clip features of the at least two video clips comprises:

performing a convolution operation on the second feature matrix at least once, to obtain a first attention matrix, one element in the first attention matrix being used for representing the first attention weight of the corresponding one of the at least two video clips.

8. The method according to claim 1, wherein before the acquiring, from the at least two video clips and according to the first attention weights, a video clip whose matching degree with the target text meets a reference condition, as a target video clip in the video that is associated with the target text, the method further comprises:

acquiring second attention weights of the video units, each second attention weight being used for indicating a matching degree between a respective video unit and the target text; and adjusting the first attention weights of the at least two video clips based on the second attention weights of the video units comprised in the at least two video clips.

9. The method according to claim 8, wherein the acquiring second attention weights of the video units comprises:

fusing the unit features of the video units with the text feature of the target text respectively, to obtain fused unit features of the video units; and obtaining the second attention weights of the video units based on the fused unit features of the video units.

10. The method according to claim 8, wherein for the target video clip in the at least two video clips, the adjusting the first attention weights of the at least two video clips based on the second attention weights of the video units comprised in the at least two video clips comprises:

determining a target video unit corresponding to a central moment of the target video clip from video units comprised in the target video clip; and adjusting the first attention weight of the target video clip based on the second attention weight of the target video unit.

11. The method according to claim 1, wherein after the acquiring, from the at least two video clips and according to the first attention weights, a video clip whose matching degree with the target text meets a reference condition, as a target video clip in the video that is associated with the target text, the method further comprises either of the following:

displaying annotation information on a playback interface of the video, the annotation information being used for indicating a start moment and an end moment of the target video clip; or displaying a link of the target video clip on the playback interface of the video, the link being used for providing a function of playing the target video clip.

12. The method according to claim 1, wherein after the acquiring, from the at least two video clips and according to the first attention weights, a video clip whose matching degree with the target text meets a reference condition, as a target video clip in the video that is associated with the target text, the method further comprises:

performing a weighting operation on the clip features of the at least two video clips based on the first attention weights of the at least two video clips, to obtain weighted clip features of the at least two video clips;

extracting features from the weighted clip features of the at least two video clips by using a long short-term memory (LSTM) network, and determining a first candidate text based on the extracted features; and acquiring a first error value between the first candidate text and the target text.

13. A computer device, comprising one or more processors and one or more memories, the one or more memories storing at least one piece of program code, the at least one piece of program code being loaded and executed by the one or more processors and causing the computer device to implement a video clip positioning method including:

extracting features from video units comprised in at least two video clips in a video, to obtain unit features of the video units;

acquiring clip features of the at least two video clips based on the unit features of the video units comprised in the at least two video clips;

performing feature fusion on the clip features of the at least two video clips with a text feature of a target text respectively, to obtain fused clip features of the at least two video clips;

obtaining first attention weights of the at least two video clips based on the fused clip features of the at least two video clips, each first attention weight being used for indicating a matching degree between a respective video clip and the target text; and acquiring, from the at least two video clips and according to the first attention weights, a video clip whose matching degree with the target text meets a reference condition, as a target video clip in the video that is associated with the target text.

14. The computer device according to claim 13, wherein the acquiring clip features of the at least two video clips based on the unit features of the video units comprised in the at least two video clips comprises:
 determining initial clip features of the at least two video clips based on the unit features of the video units comprised in the at least two video clips; and
 sampling the initial clip features of the at least two video clips, to obtain the clip features of the at least two video clips.

15. The computer device according to claim 13, wherein the performing feature fusion on the clip features of the at least two video clips with a text feature of a target text respectively, to obtain fused clip features of the at least two video clips comprises:
 acquiring the text feature of the target text;
 constructing a first feature matrix corresponding to the video based on the clip features of the at least two video clips and position information of the at least two video clips in the video;
 performing dimension extension on the text feature based on a dimension of the first feature matrix, to obtain an extended matrix of the target text, a dimension of the extended matrix being the same as that of the first feature matrix; and
 performing feature fusion on the first feature matrix and the extended matrix, to obtain the fused clip features of the at least two video clips.

16. The computer device according to claim 13, wherein before the acquiring, from the at least two video clips and according to the first attention weights, a video clip whose matching degree with the target text meets a reference condition, as a target video clip in the video that is associated with the target text, the method further comprises:
 acquiring second attention weights of the video units, each second attention weight being used for indicating a matching degree between a respective video unit and the target text; and
 adjusting the first attention weights of the at least two video clips based on the second attention weights of the video units comprised in the at least two video clips.

17. The computer device according to claim 13, wherein after the acquiring, from the at least two video clips and according to the first attention weights, a video clip whose matching degree with the target text meets a reference condition, as a target video clip in the video that is associated with the target text, the method further comprises either of the following:
 displaying annotation information on a playback interface of the video, the annotation information being used for indicating a start moment and an end moment of the target video clip; or
 displaying a link of the target video clip on the playback interface of the video, the link being used for providing a function of playing the target video clip.

18. A non-transitory computer-readable storage medium, storing a computer program that, when executed by a processor of a computer device, cause the computer device to perform a video clip positioning method including:
 extracting features from video units comprised in at least two video clips in a video, to obtain unit features of the video units;
 acquiring clip features of the at least two video clips based on the unit features of the video units comprised in the at least two video clips;
 performing feature fusion on the clip features of the at least two video clips with a text feature of a target text respectively, to obtain fused clip features of the at least two video clips;
 obtaining first attention weights of the at least two video clips based on the fused clip features of the at least two video clips, each first attention weight being used for indicating a matching degree between a respective video clip and the target text; and
 acquiring, from the at least two video clips and according to the first attention weights, a video clip whose matching degree with the target text meets a reference condition, as a target video clip in the video that is associated with the target text.

19. The non-transitory computer-readable storage medium according to claim 18, wherein the acquiring clip features of the at least two video clips based on the unit features of the video units comprised in the at least two video clips comprises:
 determining initial clip features of the at least two video clips based on the unit features of the video units comprised in the at least two video clips; and
 sampling the initial clip features of the at least two video clips, to obtain the clip features of the at least two video clips.

20. The non-transitory computer-readable storage medium according to claim 18, wherein after the acquiring, from the at least two video clips and according to the first attention weights, a video clip whose matching degree with the target text meets a reference condition, as a target video clip in the video that is associated with the target text, the method further comprises either of the following:
 displaying annotation information on a playback interface of the video, the annotation information being used for indicating a start moment and an end moment of the target video clip; or
 displaying a link of the target video clip on the playback interface of the video, the link being used for providing a function of playing the target video clip.

* * * * *